(12) United States Patent
Sinclair et al.

(10) Patent No.: US 12,253,358 B2
(45) Date of Patent: Mar. 18, 2025

(54) APPARATUS, SYSTEM AND METHOD FOR SURVEYING PREDETERMINED CHARACTERISTICS WITHIN A BODY OF FLUID

(71) Applicant: ALTUM GREEN ENERGY LIMITED, St. Helier (JE)

(72) Inventors: Jarrod James Sinclair, Upwey (AU); Brent Thomas Papesh, Bronte (AU)

(73) Assignee: ALTUM GREEN ENERGY LIMITED, St. Helier (JE)

( * ) Notice: Subject to any disclaimer, the term of this patent is extended or adjusted under 35 U.S.C. 154(b) by 194 days.

(21) Appl. No.: 17/440,518

(22) PCT Filed: Mar. 19, 2019

(86) PCT No.: PCT/AU2019/000039
§ 371 (c)(1),
(2) Date: Sep. 17, 2021

(87) PCT Pub. No.: WO2020/186282
PCT Pub. Date: Sep. 24, 2020

(65) Prior Publication Data
US 2022/0155070 A1    May 19, 2022

(30) Foreign Application Priority Data
Mar. 18, 2019  (AU) ................. 2019900892

(51) Int. Cl.
*G01C 13/00* (2006.01)
*G01P 5/06* (2006.01)
(Continued)

(52) U.S. Cl.
CPC .............. *G01C 13/002* (2013.01); *G01P 5/06* (2013.01); *G01P 5/12* (2013.01); *G01P 5/24* (2013.01); *G01S 19/01* (2013.01)

(58) Field of Classification Search
CPC .. G01C 13/006; G01C 13/004; G01C 13/002; G01C 13/00; G01C 13/008; G01C 5/06;
(Continued)

(56) References Cited

U.S. PATENT DOCUMENTS 4,175,432 A  *  11/1979  Gibson .................... G12B 9/00
                                                73/170.33
4,593,561 A     6/1986  Gavrilovic
(Continued)

FOREIGN PATENT DOCUMENTS

CN         207 036 889         2/2018
CN       112066953 A  *  12/2020  ............. G01B 21/02
(Continued)

OTHER PUBLICATIONS

Breeze, "Power Generation Technologies," REFEREX (Apr. 2015) 106-107.
(Continued)

*Primary Examiner* — Andre J Allen
(74) *Attorney, Agent, or Firm* — McDonnell Boehnen Hulbert & Berghoff LLP

(57) ABSTRACT

The present invention provides an apparatus adapted to survey a predetermined characteristic within a body of fluid adjacent an axis that transects the body of fluid, the apparatus comprising: a survey member interposed between first and second position defining arrangements; and at least one instrumentality associated with the survey member, each instrumentality adapted to survey the predetermined characteristic of the body of fluid adjacent the axis, wherein a survey of the predetermined characteristic is conducted over a predetermined time period. The present invention provides a method of surveying a predetermined characteristic within a body of fluid adjacent an axis that transects the body of fluid, the method comprising the steps of: deploying into a
(Continued)

body of fluid at least one apparatus according to the first aspect of the invention; and obtaining survey data of the predetermined characteristic from one or more of the instrumentalities over the predetermined time period. The present invention also provides methods of determining whether a potentially suitable site is a suitable site for operative location of a fluid-based electricity generator, and other related methods.

20 Claims, 18 Drawing Sheets

(51) Int. Cl.
  *G01P 5/12* (2006.01)
  *G01P 5/24* (2006.01)
  *G01S 19/01* (2010.01)
(58) Field of Classification Search
  CPC .......... G01C 17/34; G01C 25/00; G01C 5/04; G01C 9/00; G01C 9/06; G01C 9/14; G01C 9/18; G01C 21/16; G01C 21/185; G01C 21/203; G01C 9/12; G01S 19/01; G01P 5/06; G01P 5/12; G01P 5/24
  USPC .......................................... 73/170.29–170.32
  See application file for complete search history.

(56) References Cited

U.S. PATENT DOCUMENTS

| | | | |
|---|---|---|---|
| 6,332,360 B1 | 12/2001 | Su | |
| 7,705,599 B2* | 4/2010 | Strack | ...................... G01V 3/12 |
| | | | 324/323 |
| 10,011,152 B1* | 7/2018 | Kremkau | .............. B60F 3/0015 |
| 2014/0253132 A1* | 9/2014 | Juhasz | ................... G01C 13/00 |
| | | | 324/365 |

FOREIGN PATENT DOCUMENTS

| | | | | |
|---|---|---|---|---|
| CN | 113324529 A | * | 8/2021 | ............. B63B 35/00 |
| EP | 1981659 | | 1/2017 | |
| EP | 4095483 A1 | * | 11/2022 | |
| WO | WO-2015162278 A1 | * | 10/2015 | ......... G01B 11/2513 |

OTHER PUBLICATIONS

The International Search Report (ISR) with Written Opinion for PCT/AU2019/000039 dated Jun. 12, 2019, pp. 1-9.

* cited by examiner

APPARATUS, SYSTEM AND METHOD FOR SURVEYING PREDETERMINED CHARACTERISTICS WITHIN A BODY OF FLUID

CROSS REFERENCE TO RELATED APPLICATION

This application is a U.S. national phase of International Application No. PCT/AU2019/000039, filed on Mar. 19, 2019, which claims priority to Australia Patent Application No. 2019900892, filed Mar. 18, 2019, both of which are incorporated by reference herein in their entirety.

TECHNICAL FIELD

The present invention relates to the survey and analysis of fluid data. More particularly, the present invention relates to the survey and analysis of fluid data in a body of fluid, more specifically in a body of fluid in a free stream, such as a body of water in open ocean, sea, river, estuary and canal. More specifically still, the fluid data to which the invention relates concerns, in several embodiments, fluid data concerning flow dynamics for use in determining a suitable deployment location for a tidal power electricity generator.

BACKGROUND ART

The majority of electricity generated in the world today comes from fossil resources such as coal and natural gas. For environmental (and other) reasons, however, constantly increasing efforts and research and development activities are directed to the generation of electricity from renewable resources such as tidal and wind energy.

Kinetic energy from the flow of fluid has long been used to generate electricity. According to OECD data, hydroelectric plants generated over 20% of the world's electricity in 1974. Even with the advance of wind and solar electricity generation, hydroelectric plants were still responsible for around 13% of global electricity generation in 2016 (Energy Snapshot: OECD gross electricity production by source 1974-2016, International Energy Agency, https://www.iea.org/newsroom/energysnapshots/oecd-electricity-production-by-source-1974-2016.html). These traditional hydroelectric plants are mostly based on dams or dam like structures.

Tidal power is the only form of energy that draws from the orbital movements of the Earth-Moon system, and to a lesser extent the orbital movements of the Earth-Sun system. Other natural energies mostly draw directly or indirectly from the sun's radiation.

Since tidal power generation first became operational in France in 1966 (TETHYS, Pacific Northwest National Laboratory (PNNL), U.S. Department of Energy, https://tethys.pnnl.gov/annex-iv-sites/la-rance-tidal-barrage), it has undergone many technological advancements both in design and in relation to turbine technology. Tidal generators that adopt the form of horizontal axial turbines represent the most common type of tidal device (2014 JRC Ocean Energy Status Report, European Commission, 2015). Many of tidal turbine generators currently operating as prototypes are of the axial turbine type. These turbines are similar in concept to windmill-like or 3-bladed wind turbines, but they operate under water. They are often referred to as rotors as the blades are rotated around an axis by the movement of the mass of fluid.

These rotors may be bottom mounted at the sea/river bed, cable tethered or floated at a predetermined depth in a body of fluid or suspended in the fluid by a floatation mechanism or superstructure. Like other configurations of tidal power generator, the amount of energy produced is related to the velocity of fluid flow and the total available period of flow in the tidal streams.

The amount of tidal energy available from a particular volume of fluid fluctuates and is highly dependent on location because of the interaction between complex orbital movements of the Earth-Moon and Sun-Earth system, and geographical configuration/topology of the ocean and earth. In addition, velocities of tidal streams are also affected by a variety of factors, such as friction against the river/sea bed/bank or other superstructures, the detailed bathymetry of the body of water, and winds and waves affecting the surface.

Installation of tidal and/or current turbines in an ocean, sea, river, canal, or other operating environments involves considerable cost and time. This is due in part to the requirement for a mix of technical disciplines including mechanical, manufacturing, fluid dynamics, structural, and marine engineering, each requiring a high degree of expertise to complete the installation successfully. A typical cost breakdown, as presented by Fraenkel (ITES conference presentation, International Tidal Energy Summit, 23-25 Nov. 2015, London, UK), identifies that substantial costs are likely to be incurred in three key areas: (a) turbine fabrication, (b) support structure construction, and (c) installation and integration works. Support structure construction and installation and integration works, areas (b) and (c) respectively, are activities that are nonportable and must be carried out at each specific site chosen to deploy turbine/s.

Therefore, the selection of a deployment site for a tidal electricity generator needs to be carefully considered. Without a robust site surveying methodology and associated apparatus, it may be difficult to locate sites with sufficiently high flow velocities to generate justifiable quantities of electricity.

As the productivity of wind turbines also heavily depends on location, it is also preferable to survey the area of interest for suitable sites to deploy wind turbines.

Besides electricity generation, fluid data surveying and analysis also serves many other purposes. For instance, fluid stream velocity analysis has long been used for oceanography covering a wide range of topics such as ecosystem dynamics, waves, geophysical fluid dynamics, plate tectonics and the geology of the sea floor, and fluxes of various chemical substances and physical properties within the ocean and across its boundaries. Governments and environmental agencies are also using fluid flow data to assess or monitor environmental impacts of projects and developments on fluid systems (*Collation and analysis of oceanographic datasets for National Marine Bioregionalisation: A report to the Australian Government*, National Oceans Office, May 2005, CSIRO Marine Research (https://parksaustralia.gov.au/marine/pub/scientific-publications/archive/nmb-oceanociraphic-report.pdf); An assessment pf the value of the Physical Oceanographical Real-Time System (PORTS®) to the U.S. economy, National Oceanic and Atmospheric Administration (NOAA), 30 Sep. 2013, (https://tidesandcurrents.noaa.gov/publications/ASSESSMENT_OF_THE_VALUE_OF_PORTS_TO_THE_US_ECONOMY.pdf)).

Traditionally, infrastructure such as gauging stations are used to measure tidal discharges and other parameters. Since the mid-1980s, Acoustic Doppler Current Profilers (ADCP)

have been introduced and used to measure fluid current velocities over a depth range. ADCPs utilise the Doppler effect of sound waves, ranging from several Kilo-Hertz to several Mega-Hertz, scattered back from particles within a column of fluid extending above or below the ADCP.

While the absence of moving physical parts, that are subject to biofouling (biomass build-up over time) and remote sensing capabilities, are advantages of ADCPs, ADCPs have many disadvantages.

First, for relatively long-term surveying in the ocean, which is often required when selecting deployment sites for tidal generators, ADCPs are often deployed at the sea floor facing up toward the surface because the cost associated with having a boat carry the ADCP facing down to the sea floor (known as a Transect Survey) for an extended period is prohibitively high.

It is known that ADCPs lose data close to boundaries (the loss of velocity information may account for 6-12% of relevant data from a column of fluid being analysed) (Measuring Discharge with Acoustic Doppler Current Profilers from a Moving Boat, Alain Pietroniro, Environment Canada, 2013, (http://www.wmo.int/pages/prog/hwrp/qmf-h/documents/qmsdoc/qSOP-Eng-LevelQ3/qSOP-NA038-01-2013%20ADCP%20Discharge%20Measurement%20by%20Moving%20Boat.pdf). ADCPs sitting at fluid floors facing up toward the surface can lose a large portion of velocity information close to the surface. As fluid stream velocities are generally higher when the streams are closer to surfaces in rivers/ocean and high velocity depth range is often of interest in deploying tidal generators, this data loss has significantly negative impacts on the utility of ADCPs in selecting suitable deployment sites for tidal generators.

Secondly, ADCPs are costly to manufacture. The flow measuring sensors of an ADCP are highly sensitive and require precision fabrication and assembly in order to function correctly. They are also required to be periodically calibrated to maintain their accuracy. This periodic calibration itself is also costly.

Due to the prohibitive cost of acquiring and operating an ADCP, a small number of ADCP devices are typically used for a site survey, limiting the amount of spatial data collected in an area of interest. This leads to creation of approximate mathematical models to extend the captured dataset into regions that have not been captured by the ADCP sensors. These approximate models can misrepresent the fluid flow velocity and lead to significant errors in flow velocity within the fluid volume not captured directly by the ADCP sensor.

Moreover, there is a need for improved methods and apparatuses for surveying and analysing volumes of fluid, including in liquid and air. There is a need for such methods and apparatuses to improve the manner in which suitable deployment sites for electricity generation mechanisms are identified for improved efficiencies in electricity generation, including from an overall cost perspective.

Any reference to or discussion of any document, act or item of knowledge in this specification is included solely for the purpose of providing a context for the present invention. It is not suggested or represented that any of these matters or any combination thereof, formed, at the priority date, part of the common general knowledge, or was known to be relevant to attempt to solve any problem with which this specification is concerned.

SUMMARY OF INVENTION

According to a first aspect, the present invention provides an apparatus adapted to survey a predetermined characteristic within a body of fluid adjacent an axis that transects the body of fluid, the apparatus comprising:

a survey member interposed between first and second position defining arrangements; and at least one instrumentality associated with the survey member, each instrumentality adapted to survey the predetermined characteristic of the body of fluid adjacent the axis, wherein a survey of the predetermined characteristic is conducted over a predetermined time period.

According to some embodiments, the body of fluid further includes an additional volume of fluid associated with the axis. In some such embodiments, the association between the additional volume of fluid and the axis is spatial. Some such embodiments disclose that there is nothing physically connecting the additional volume of fluid with the axis. Other embodiments disclose that the association between the additional volume of fluid and the axis is physical. The additional volume of fluid is preferably or alternatively in fluid communication with the body of fluid or is adjacent the body of fluid.

In some preferred and alternative embodiments, the association between the instrumentality or instrumentalities and the survey member is spatial. Some such embodiments provide that there is nothing physically connecting or affixing the one or more instrumentality to the survey member. In some such embodiments, the at least one instrumentality is connected to the first or second position defining arrangement or to some other item.

Preferably, the association between the instrumentality or instrumentalities and the survey member is physical. In some such embodiments, the instrumentality or instrumentalities are connected (whether releasably, fixedly, or integrally) to the survey member between the first and second position defining arrangements. Embodiments of the apparatus that have two or more instrumentalities provide that the instrumentalities may be evenly or unevenly spaced apart between the first and second position defining arrangements.

In some embodiments where the association is physical, at least one of the instrumentalities is connected via an elongate member, such as, for example, a section of rope. Preferably, the elongate member is adapted so that the weight of the instrumentality causes it to hang in a substantially vertical orientation, even in circumstances where the survey member is on an angle to, for example, the vertical. This could occur, for example, when the apparatus is deployed in a body of fluid with a current flowing in one direction, such that the first and second position defining arrangements are offset from one another in a vertical plane because the current causes one of the two position defining arrangements to move away from the vertical plane in which the other position defining arrangement is positioned at a given point in time.

The surveyed body of fluid adjacent the axis is preferably a column shape, whether regular or irregular. In such embodiments, and in some others, the axis is a longitudinal central axis about which the column is formed. However, it should be appreciated that other shapes and/or configurations for the body of fluid are within the scope of the invention. In broad terms the shape and/or configuration of the body of fluid is defined by a volume of fluid surrounding the axis, the approximate metes and bounds of the volume of fluid being determined as relative to the metes and bounds of fluid that can be surveyed by the at least one instrumentality.

In some preferred embodiments, the axis is substantially a straight line and the survey member is adapted to be substantially parallel to the axis. In some other preferred embodiments, the survey member is adapted to substantially overlap with the axis. In some further preferred embodiments, the survey member forms the axis.

In embodiments of the invention used to determine suitable deployment sites for wind turbines, the apparatus, in some embodiments, transects a body of fluid in gas form, surveying wind velocities at different predetermined heights in different predetermined locations.

Depending on the number and type of instrumentality/ies and the specific survey member used, the shape and size of the apparatus can vary. Preferably, the environments in which the apparatus can be deployed varies from large bodies of fluid, such as would be found in oceans, lakes, rivers or open air, to narrow or restrained bodies of fluid, such as might be found in spaces such as estuaries, tunnels or caves.

In some embodiments, wherein an instrumentality surveys by means of fluid flow through, for example, an aperture or means for receiving survey fluid, such as, through a pipeline or in fluid communication with a venturi or other orifice-based meter, it is preferred that the instrumentality is oriented so as to receive fluid flow substantially directly into the aperture. In some such embodiments, a fin member or rudder like mechanism, or other suitable orientation mechanism, is further included in the apparatus so as to aid in orienting such instrumentality to receive fluid in a manner enabling survey.

Some examples of instrumentalities that survey by reference to fluid flow include anemometer-based instrumentalities which convert rotational speed into a flow velocity measurement. In some such embodiments, the anemometer is preferably oriented so as to receive fluid flow in substantially the same plane as the direction of rotation. In other such embodiments, the anemometer is oriented so as to receive fluid flow substantially perpendicularly to the plane of direction of rotation.

In some preferred embodiments, suitable anemometers are fan-like with blades, cups or both. Fluid flowing toward a face of the fan-like anemometer applies pressure to fan blades or fan cups causing the fan-like anemometer to rotate. The instrumentality calculates velocity of fluid flow based on the speed of the fan-like anemometer's rotation.

Fluids for which anemometer-based instrumentalities are preferred include liquid and gas. As would be appreciated by persons skilled in the art, not all anemometer-based instrumentalities survey by reference to speed of rotation.

Another example of an anemometer-based instrumentality that is adopted in some embodiments of the apparatus is a hot-wire anemometer. Such an anemometer converts changes in resistance across the hot-wire, caused by variations in temperature resulting from fluid flowing past the hot-wire, into fluid velocity measurements. Other similarly-based anemometers, or systemic variations to them, are constant current anemometers, constant voltage anemometers, constant temperature anemometers, and pulse-width modulation anemometers.

Pitot tube static anemometers are yet still further examples of suitable instrumentalities that are adopted by the invention. Typically, such anemometers include a tube with a static port and a pitot port. Preferably, the pitot port measures total pressure at an open mouth of the tube oriented to face incoming fluid flow, and the static port measures static pressure from apertures along a side of the tube. The static pressure value is then subtracted from the total pressure measurement to isolate the dynamic pressure. Since dynamic pressure is defined as one half of the fluid density multiplied by the fluid velocity squared, the fluid velocity value can be determined from the dynamic pressure measurement.

Further examples of anemometer-based instrumentalities adopted in some embodiments of the invention are those which employ laser, ultrasound or acoustic resonance to survey fluid flow.

In some embodiments, an acoustic resonance anemometer is adopted as one instrumentality. Typically, a plurality of ultrasonic transducers are built into a cavity through which fluid flows. Each transducer is adapted to create separate standing-wave patterns at different ultrasonic frequencies. Phase shifts in the standing-wave patterns occur as fluid flows through the cavity and the amount of phase shift is determined by each transducer. In turn, the determinations by each transducer are processed such that a fluid flow velocity and direction is determined.

Some preferred and alternative embodiments disclose that an ADCP is adopted as one instrumentality. Typically, an ADCP may be adopted as one or more instrumentality/ies in embodiments of the apparatus adapted for deployment where the body of fluid is a liquid. ADCPs are commonly used in such circumstances to measure fluid flow characteristics in the ocean or in other large bodies of liquid. ADCPs can measure the water velocity across a large water column in defined and regular bins throughout that column. They typically have measurements that are taken and saved locally in the ADCP device. By adopting an ADCP as one instrumentality, the capabilities of the ADCP can be extended/expanded by acquiring and transmitting ADCP sensor data to remote data storage facilities in real-time, batched or on-demand.

As the instrumentality/ies may vary from one embodiment to another, the apparatus can be used to survey not only characteristics, such as those associated with movement of fluid, for example, velocity, but also characteristics such as those associated with the presence or absence of one or more composition/s or contaminant/s, and if present, the concentration of the/those composition/s or contaminant/s. In some embodiments, the composition of interest is known.

In some embodiments, for example, the predetermined composition is selected from the group consisting of one or more of: ammonia, nitrogen, phosphorus, pesticide, furan, dioxin, phenol, mercury, lead, nickel, arsenic, cadmium and radioactive waste.

In some embodiments, the composition is a known pollutant in a fluid or air system. Certain embodiments of the apparatus may be established to detect and monitor the presence or concentrations of predetermined pollutants. The presence or concentration of predetermined minerals or organisms can, in some embodiments, also be surveyed, detected or monitored by some embodiments of instrumentality/ies for other environmental or scientific purposes.

In some preferred and alternative embodiments, instrumentalities adopted for the apparatus so that further characteristics of the body of fluid can be surveyed include:

| Instrumentality | Predetermined characteristic |
| --- | --- |
| Hydrometer | Salinity |
| Conductivity meter | Salinity |
| Water quality meter | Dissolved oxygen (DO) |
| Water quality meter | Dissolved carbon dioxide |
| Water quality meter | Potential of hydrogen (pH) |
| Water quality meter | Turbidity/suspended solids |

In some further embodiments, other characteristics of the body of fluid, such as viscosity, temperature, and density may also be surveyed. It will be appreciated by persons skilled in the art that any one of a number of characteristics of a body of fluid can be surveyed with suitable sensing technology contained in or adapted to engage with an instrumentality. In other words, the apparatus of some preferred and alternative embodiments is adapted to survey a body of fluid in relation to a number of different characteristics. In some such embodiments, each instrumentality includes a sensor or survey means adapted to sense or survey a particular characteristic. In other embodiments, an instrumentality can incorporate or engage with more than one sensor or survey means, in which case such instrumentality is capable of surveying multiple characteristics in the body of fluid.

In some preferred and alternative embodiments, once deployed, the positions of the instrumentalities relative to the apparatus preferably remains unchanged during the predetermined period. In some embodiments, the instrumentalities are secured to the survey member so as to inhibit substantial angular or dimensional movement between the instrumentalities and the survey member.

In some embodiments, the apparatus is used to survey at a range of depths or heights at one predetermined location in the body of fluid. In some such preferred embodiments, traversing a target range of depth is preferably achieved with the axis transecting the body of fluid substantially perpendicularly to a bottom or top plane of the body of fluid.

In other embodiments, the axis might not be perpendicular to the floor or top of the body of fluid because a gradient is created by, for example, changes in velocity or other predetermined characteristics throughout the depth of the body of fluid being surveyed.

Preferred and alternative embodiments disclose that the implementation of the position defining arrangements vary. In some embodiments, one end of the survey member is positioned at the sea/river floor by anchor, buoyancy control device or weight, causing the first position defining arrangement to be substantially fixed or to substantially rest on the sea/river floor where the anchor, buoyancy control device or weight, comes to rest or engages with the floor. Some embodiments of the apparatus do not require an end of the survey member to touch or be adjacent the floor. In such embodiments, the anchor, buoyancy control device or weight, is adapted to define the position of the first position defining arrangement by applying a suitable amount of weight, downward buoyancy, or increased density, so as to maintain the first position defining arrangement at the preferred relative depth.

In some of the same and in some other embodiments, the implementation of the second position defining arrangement includes securing the other end of the survey member to and/or within a superstructure above or otherwise adjacent a surface of the body of fluid, such as a wharf or a bridge.

According to a second aspect, the present invention provides an apparatus adapted to survey a predetermined characteristic within a body of fluid adjacent an axis that transects the body of fluid, the apparatus comprising:
  a survey member interposed between first and second position defining arrangements; and
  at least one instrumentality associated with the survey member, each instrumentality adapted to survey the predetermined characteristic of the body of fluid adjacent the axis,
  wherein the apparatus is affixed to a structure within or adjacent the body of fluid, and
  wherein a survey of the predetermined characteristic is conducted over a predetermined time period.

In some other preferred embodiments, the second position defining arrangement is implemented by a float, buoyancy control device or buoy, adapted to maintain an end of the survey member at or adjacent a surface of the body of fluid or at a predetermined distance below the surface. Some embodiments of the apparatus do not require an end of the survey member to touch or be adjacent the surface. In such embodiments, the float, buoyancy control device or buoy, is adapted to define the position of the second position defining arrangement by applying a suitable amount of buoyancy, upward buoyancy, or decreased density, so as to maintain the second position defining arrangement at the preferred relative depth.

When used in this specification, the expression 'buoyancy control device' is not intended to have a narrow meaning. For example, in one preferred embodiment, a buoyancy control device means a flotation device or flotation means, such as a buoy, or any other device or means capable of providing buoyancy, or resisting or overcoming a buoyancy counter-force, such as that provided by a weight or other object or means that does not float or that resists or overcomes flotation. In another preferred embodiment, a buoyancy control device means a weight, such as an anchor, or any other device or means that sinks or is capable of resisting or overcoming buoyancy. In other preferred and alternative embodiments, buoyancy control device means a device or means adapted to regulate a depth at which the device or means achieves neutral buoyancy or substantially neutral buoyancy, such as, for example, as is sometimes called, a buoyancy compensator. In other preferred and alternative embodiments, buoyancy control device means a device or means adapted to control and/or maintain the vertical positioning in the fluid.

Persons skilled in the art will appreciate from the description that the apparatus of preferred and alternative embodiments can be adapted to take on different relative depths within the body of fluid that they are respectively surveying. In some embodiments, for example, the first position defining arrangement is positioned on or adjacent the sea/river bed.

In other embodiments, for example, the first position defining arrangement is positioned at a predetermined distance above the sea/river floor or at a predetermined depth. In some such embodiments, the second position defining arrangement can be adapted to position the other end of the survey member at or adjacent the surface of the volume of fluid or at a predetermined depth below the surface. Accordingly, the apparatus can be deployed at or adjacent the surface of the body of fluid, or at or adjacent the floor of the body of fluid.

The apparatus can be deployed interposed between the surface and the floor of the body of fluid. In some such embodiments, the velocity of the fluid or currents in or adjacent the body of fluid may carry the apparatus. In some preferred embodiments, the apparatus is inhibited from moving with the flow of the body of fluid.

According to a third aspect, the present invention provides an apparatus adapted to survey a predetermined characteristic within a body of fluid adjacent an axis that transects the body of fluid, the apparatus comprising:
  a survey member interposed between first and second position defining arrangements, and at least one instrumentality associated with the survey member, each instrumentality adapted to survey the predetermined characteristic of the body of fluid adjacent the axis, wherein the apparatus is inhibited from moving with the flow of the body of fluid, and wherein a survey of the predetermined characteristic is conducted over a predetermined time period.

According to some preferred and alternative embodiments, a buoyancy control device at at least one of the position defining arrangements is adapted to actively (whether periodically, constantly or on demand) effect variation of the depth of the apparatus.

In some deployed arrangements of the apparatus, for example, an end of the apparatus closest to the surface of the body of fluid (for present exemplary purposes only, 'an upper end') may be submerged below the surface. In some such deployed arrangements, it may be desirable to periodically or on demand have the upper end of the apparatus at or above the surface of the body of fluid. For such occasions, the buoyancy control device at the position defining arrangement adjacent the upper end of the apparatus is adapted to actively cause the upper end of the apparatus to move to that position by decreasing the relative density of that buoyancy control device.

By way of further example, in other deployed arrangements of the apparatus, an end of the apparatus closest to the floor of the body of fluid (for present exemplary purposes only, 'a lower end') may be situated above the floor. In some such deployed arrangements, it may be desirable to periodically or on demand have the lower end of the apparatus against the floor of the body of fluid. For such occasions, the buoyancy control device at the position defining arrangement adjacent the lower end of the apparatus is adapted to actively cause the lower end of the apparatus to move to that position by increasing the relative density of that buoyancy control device.

The position defining arrangements can each have or be a buoyancy control device adapted to actively (whether periodically, constantly or on demand) effect variation of the depth of the apparatus. In some such embodiments, the buoyancy control devices can work cooperatively to have the apparatus move to a desired depth (whether periodically, constantly or on demand). However, it will be appreciated that in certain deployment arrangements, only one buoyancy control device may need to have the ability to actively effect variation of the depth of the apparatus. This is because one buoyancy control device that increases its relative density can do so sufficiently, in some circumstances, to counter the relative buoyancy of an opposing 'inactive' buoyancy control device, thereby causing the apparatus to descend in depth. Equally, one buoyancy control device that decreases its relative density can do so sufficiently, in some circumstances, to counter the relative weightiness of an opposing 'inactive' buoyancy control device thereby causing the apparatus to ascend in depth.

In some preferred and alternative embodiments, the survey member takes the form of a chain, rope, cord, cable, wire, thread, tube, hose or other similar such member. Such forms of the survey member are preferred because in such forms the survey member is bendable and can change shape responsive to extraneous forces, such as, for example, flow velocity and gravity. In other embodiments, the survey member is formed of a stiffer material or configuration, or one that is rigid.

In an environment, such as that found submerged in an ocean, river or lake, for example, objects can have a biomass build-up upon them over time. Biofouling can adversely affect functionality of the instrumentalities. In preferred, and some alternative, embodiments, the survey member, each or both position defining arrangements, and each, some or all of the instrumentalities are treated with a coating to inhibit biofouling. In preferred, and some alternative, embodiments, the coating is a non-toxic antifoul coating that, following application, leaves a surface to which it has been applied in a form inhibiting marine life from engaging/adhering to that surface, thereby inhibiting bio-fouling (or bio-mass build-up). Alternatively, inhibition of bio-failing could be achieved by adopting materials for one or more components of the apparatus that are impregnated with a material that has inherent anti-fouling properties.

In some preferred embodiments, the surveyed predetermined characteristic is associated with geographical information about the instrumentality. In some such embodiments, geographical information such as longitude and latitude, along with depth/height data are to be associated with the predetermined characteristic at different times. The apparatus of some embodiments further includes a global positioning system (GPS) adapted to determine the geographical location of the apparatus.

Various embodiments of the invention further disclose, or otherwise include, one or more additional instrumentalities or other sensors. For example, in some embodiments, an object sensor is included at or adjacent at least one of the position defining arrangements. In some such embodiments, the sensor can feedback when a position defining arrangement has reached, for example, the sea/river bed or other surface of an object.

One or more instrumentalities or additional instrumentalities or sensors may be connected to, or be otherwise in association with, different components of the apparatus or to or with an additional member which is connected to, or be otherwise in association with, different components of the apparatus.

For example, in some embodiments, a distal end of an additional elongate member extends from the first position defining arrangement where its proximal end is releasably connected. Releasably connected to a distal end of the additional elongate member is an instrumentality in the form of an ADCP. The ADCP is preferably positioned so as to survey a predetermined characteristic, being fluid flow velocity, in an additional volume of fluid. In this example, the additional volume of fluid is in overlapping fluid communication with the body of fluid.

However, in other examples, the length of the additional elongate member may be such as to enable the additional volume of fluid to be in non-overlapping fluid communication with the body of fluid. In some such examples, the instrumentality releasably connected to the distal end of the additional elongated member is adapted to survey a predetermined characteristic of the additional volume of fluid, being a second body of fluid adjacent the body of fluid. Such embodiments effectively expand the reach of the apparatus.

The electronics and data transfer mechanisms contained in the apparatus in preferred and alternative embodiments are adapted to facilitate the flow of data through the apparatus in so far as is necessary to transfer survey data obtained by the instrumentalities (and in embodiments that have them, additional instrumentalities and/or sensors) to a central processing unit and data store. They are also adapted to facilitate the flow of data from an external source in embodiments that are adapted to receive and process such data. The external source is discussed in more detail below. For now, the description remains focused on the electronics and data transfer mechanisms contained in the apparatus.

In preferred embodiments, physical data and/or power cables connect the instrumentalities, central processing unit and data store. In some such embodiments, the central processing unit and data store are housed in or adjacent one of the position defining arrangements. In other embodiments, the central processing unit and data store are housed in or adjacent different components. For example, in some embodiments, the central processing unit is housed in or adjacent the first position defining arrangement and the data store is housed in or adjacent the second position defining arrangement. In other embodiments, one or the other of the central processing unit and the data store is housed in or adjacent an instrumentality.

Typically, survey data flows from each instrumentality to the central processing unit or to the data store. Survey data may also be transferred between the data store and the central processing unit, particularly in embodiments where raw survey data requires or would benefit from processing prior to storage or internal or external transfer.

In some embodiments, the transfer of data internally as between the instrumentalities, central processing unit and data store is effected wirelessly.

Preferred and alternative embodiments disclose that the apparatus further includes a data transmitter for transmitting data between the apparatus and an external source. The data transmitter preferably transmits data over one or more available wireless data transmission means, including radio frequency link, cellular link and/or satellite link. In some embodiments the data transmission means is direct or physical cable link. However, such embodiments are typically (but by no means always) reserved for circumstances wherein the apparatus is within reasonable proximity to the external source so that a distance between the apparatus and the external source can be spanned by the length of the direct or physical cable link. An example of such an embodiment is one in which the apparatus is deployed from a wharf and is to remain relatively proximal to the wharf or where one of the position defining arrangements is fixed to a wharf or jetty.

For embodiments of the invention adapted to be deployed in a large body of fluid, such as the ocean, and which are intended to remain relatively far from a wharf, jetty, vessel, physical structure, land, or otherwise at a remote site, the data transmitter is preferably housed in or adjacent the position defining arrangement that is or is to be at or adjacent the surface of the body of fluid. Such a configuration permits the data transmitter to be closest to the surface of the ocean, a location from where wireless transmission of data is more facilitated than if the data transmitter is submerged in the ocean.

In embodiments of the invention wherein the data transmitter is submerged because of, for example, the depth at which the apparatus has been deployed, a signal amplifier, or some other means capable of enabling the transmission of data through liquid, may be used or may need to be adopted. In some such embodiments, as explained above, one or more buoyancy control devices could be configured such that a portion of the apparatus where the data transmitter is housed is actively elevated to the surface of the body of fluid periodically, constantly or on demand.

The external source is preferably a hub or server adapted to enable data received from the apparatus to be accessed, including via low frequency radio link, Wi-Fi, Bluetooth, or the internet. Measurement data from the instrumentalities can be sent over a communication network to the hub, which in turn relays the data to a data receiving and storage system potentially over the Internet. In another preferred embodiment, the data can be requested from the remote storage system and the data is transferred from the instrumentality via the hub over the communication network. The data can be accessed for further processing or analysis.

In some embodiments, the hub or server is also adapted to transmit data to an apparatus according to the invention. The data sent to the apparatus includes control data, calibration data, self-test data, or, for example, on/off control data. In some preferred embodiments the data transmitted to the apparatus may, for example, be a data packet which, when executed, provides instruction to a buoyancy control device to effect a variation to the depth of the apparatus.

In some embodiments, the apparatus further includes a propulsion means. In some such embodiments, data transmitted from the external source may, for example, be a data packet which, when executed, provides instruction to the propulsion means to vary the location of the apparatus.

Survey data may be received, in preferred and alternative embodiments, by the external source or by otherwise physically accessing the apparatus.

The surveyed data of preferred embodiments is collected by the apparatus over a predetermined time period. However, the time period over which data is collected may be varied. Data may be collected, for example, in real-time, periodically based on a program to schedule, in a batch, upon request, on demand, and at completion of a survey As the predetermined characteristics of the body of fluid may reflect a pattern/s over a period of time, it is preferred that the predetermined period of time for survey varies. In some embodiments, at least one complete tidal cycle, or a one lunar cycle, is to be surveyed. In some other embodiments, however, the predetermined time period for survey is one week, one month, three months, or one year. In still other preferred and alternative embodiments, the predetermined time period for survey is indefinite.

In some preferred embodiments, the wireless transmitter also transmits status information for each instrumentality including identification, working/error status, or geographical location information and a time stamp.

In some embodiments, one or more of the elements of the apparatus are powered by a power store, such as a battery. In some other embodiments, those one or more elements are powered by solar power, such as from solar panels mounted so as to collect solar power. In some other embodiments, the one or more elements are powered by an external power source, such as at a wharf, jetty or on land. In some further embodiments, the elements of the apparatus receive power from more than one of these and other power sources.

Preferred and alternative embodiments disclose that the surveyed data obtained from an apparatus can be used to assist in determining a suitable location for deployment of an electricity generator based on fluid flow data, including velocity. As will be appreciated by persons skilled in the art, fluid flow data suitable for use in electricity generation includes, for example, air flow for wind generators and tidal and/or current flow for tidal power generators.

According to a fourth aspect, the present invention provides an apparatus adapted to survey a predetermined characteristic within a body of fluid adjacent an axis that transects the body of fluid, where the results of the survey are used to identify a geographical location to be used for positioning a hydro-electricity generator in the body of fluid, the apparatus comprising:

a survey member interposed between first and second position defining arrangements; and at least one instrumentality associated with the survey member, each instrumentality adapted to survey the predetermined characteristic of the body of fluid adjacent the axis, wherein a survey of the predetermined characteristic is conducted over a predetermined time period.

According to a fifth aspect, the present invention provides an apparatus adapted to identify a location in a body of fluid for deployment of a hydro-electricity generator by surveying a predetermined characteristic within the body of fluid adjacent an axis that transects the body of fluid, the apparatus comprising:

a survey member interposed between first and second position defining arrangements; and at least one instrumentality associated with the survey member, each instrumentality adapted to survey the predetermined characteristic of the body of fluid adjacent the axis, wherein a survey of the predetermined characteristic is conducted over a predetermined time period.

In some embodiments, a plurality of apparatuses according to the invention are deployed across or within an expansive body of fluid so that surveyed data from multiple positions across or within the expansive body of fluid can be obtained, including obtained concurrently. Deployment of a plurality of apparatuses as such enables an assessment to be undertaken of a larger body of water than may be possible from one apparatus alone. Processing and analysis of the data from a plurality of apparatuses can also be used to assist in determining a suitable deployment site for a fluid-based electricity generator.

In some preferred and alternative embodiments, when the apparatus of preferred embodiments is deployed or to be deployed in a body of liquid, it is deployed in a free stream.

According to a sixth aspect, the present invention provides a method of surveying a predetermined characteristic within a body of fluid adjacent an axis that transects the body of fluid, the method comprising the steps of:

a. interposing a survey member between first and second position defining arrangements; and b. surveying the predetermined characteristic of the body of fluid adjacent the axis with an instrumentality, wherein the survey of the at least one predetermined characteristic is conducted over a predetermined period of time.

According to a seventh aspect, the present invention provides a method of surveying a predetermined characteristic within a body of fluid adjacent an axis that transects the body of fluid, the method comprising the steps of:

a. deploying into a body of fluid an apparatus according to the first aspect of the invention; and b. obtaining survey data of the predetermined characteristic from one or more of the instrumentalities over the predetermined time period.

According to an eighth aspect, the present invention provides a method of surveying a predetermined characteristic within a body of fluid adjacent an axis that transects the body of fluid, the method comprising the steps of:

a. interposing between first and second position defining arrangements a survey member, the survey member having at least one instrumentality adapted to survey the predetermined characteristic of the body of fluid adjacent the axis; and b. surveying with the instrumentality, over a predetermined period of time, the predetermined characteristic of the body of fluid adjacent the axis.

According to a ninth aspect, the present invention provides a method of determining whether a potentially suitable site is a suitable site for operative location of a fluid-based electricity generator, the method comprising:

a. identifying a potentially suitable site anticipated to be suitable for operative location of a fluid-based electricity generator;

b. deploying at or within a predetermined distance from the potentially suitable site an apparatus according to the first aspect of the invention;

c. obtaining surveyed data from the apparatus over the predetermined time period; and d. determining, based on the surveyed data, whether the potentially suitable site is a suitable site for operative location for a fluid-based electricity generator.

According to a tenth aspect, the present invention provides a method of determining an operative location for a fluid-based electricity generator, the method comprising:

a. identifying a potentially suitable site anticipated to be suitable for operative location of a fluid-based electricity generator;

b. deploying at or within a predetermined distance from the potentially suitable site an apparatus according to the first aspect of the invention;

c. obtaining surveyed data from the apparatus over the predetermined time period;

d. determining, based on the surveyed data, whether the potentially suitable site is a suitable site for operative location for a fluid-based electricity generator;

e. if the determination in step d. is that the potential suitable site is not suitable for operative deployment of a fluid-based electricity generator, identify a further potentially suitable site, and repeating steps a. through d. in respect of the further potentially suitable site and, if necessary for still further potentially suitable sites; and f. determining, based on the surveyed data from all potentially suitable sites, an operative site for a fluid-based electricity generator.

In some preferred and alternative embodiments of the method of the ninth and tenth aspects, the term 'suitable', in relation to a site, includes a site at which if a fluid-based electricity generator was deployed a quantity of electricity that is likely to generated from the fluid-based electricity generator is sufficient to achieve at least one or more of the following:

a. justify deployment of the fluid-based electricity generator at that site; or b. offset the costs of deploying the electricity generator at that site; or c. enable a profit to be generated from deployment of the fluid-based electricity generator at that site; or d. select that site for deployment over another site for deployment of a fluid-based electricity generator; or e. surmise that that site is likely to be an optimal location for deployment of a fluid-based electricity generator.

In some preferred and alternative embodiments of the method of the ninth and tenth aspects of the invention, the apparatus is inhibited from moving with the flow of the body of fluid.

In some preferred and alternative embodiments of the method of the ninth and eighth aspects of the invention, more than one apparatus is deployed at, around and/or within each potentially suitable deployment site.

Preferably the fluid-based electricity generator is a wind-turbine or a tidal turbine. In some particularly preferred embodiments, the fluid-based electricity generator is a tidal turbine adapted to be deployed, and operative, in a free stream.

BRIEF DESCRIPTION OF THE DRAWINGS

Preferred embodiments of the invention will now be described and illustrated by reference to the accompanying drawings.

FIG. 4 are a series of diagrams each illustrating a potential configurations for an instrumentality suitable for use in preferred embodiments of the invention.

FIG. 8 are a series of diagrams each illustrating a potential deployed position for an apparatus according to a preferred embodiment of the invention.

FIG. 10 are a series of schematic diagrams each illustrating a different configuration for the transfer of data, included surveyed data, between an apparatus and an external source according to various embodiments of the invention.

DETAILED DESCRIPTION OF EMBODIMENTS

Figure 1:
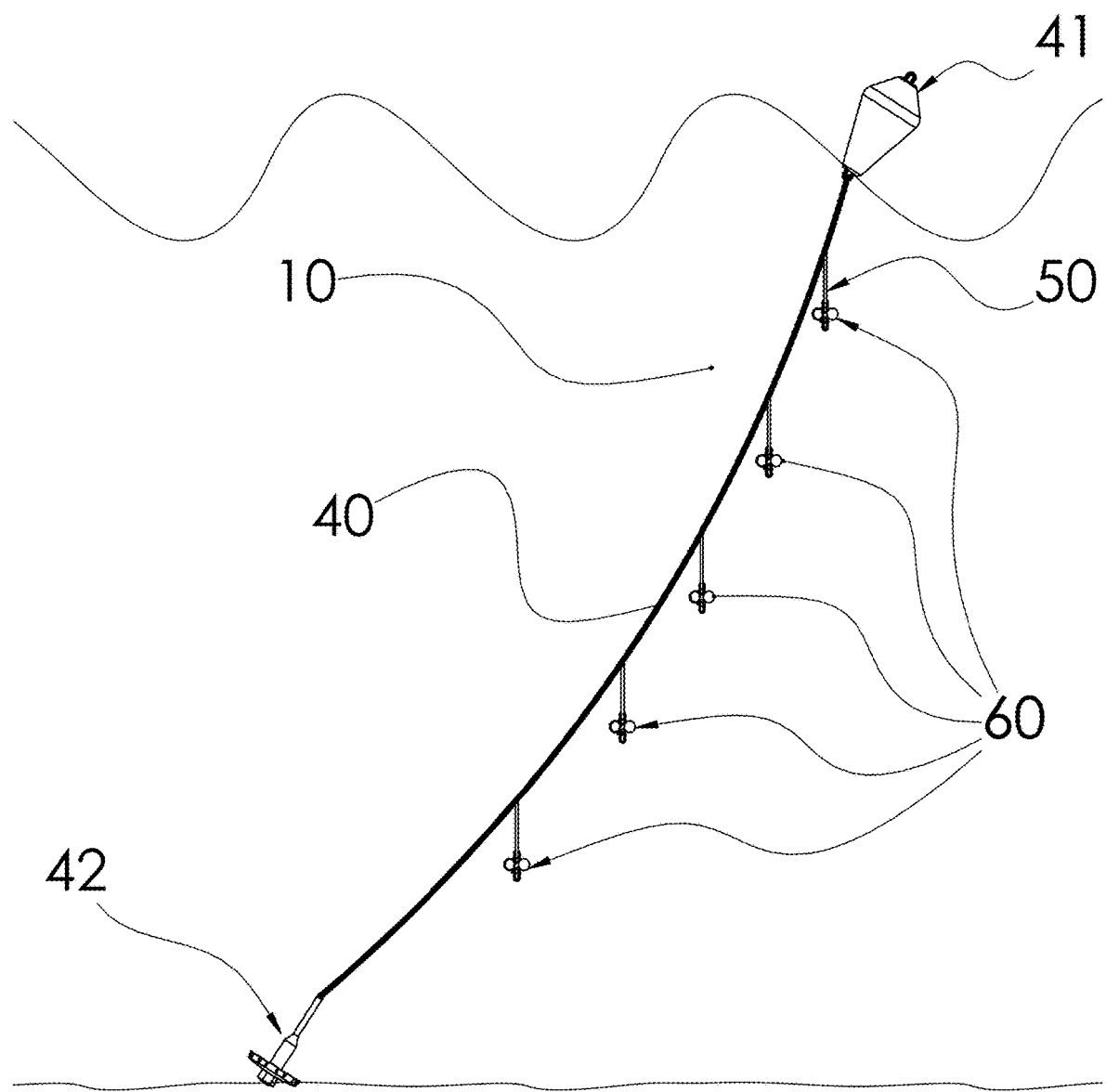
FIG. 1 is a schematic diagram illustrating a typical embodiment of the apparatus deployed in volume of hydrodynamic fluid/sea.

Preferred embodiments of the invention will now be described with reference to the accompanying drawings and non-limiting examples.

Preferred embodiments disclose that the present invention provides an apparatus 10 adapted to survey a predetermined characteristic within a body of fluid 20 adjacent an axis 30 that transects the body of fluid 20, the apparatus 10 comprising:
a survey member 40 interposed between first and second position defining arrangements 41, 42; and
at least one instrumentality 60 associated with the survey member 40, the instrumentality 60 adapted to survey the predetermined characteristic of the body of fluid 20 adjacent the axis 30,
wherein a survey of the predetermined characteristic is conducted over a predetermined time period.

Figure 1A:
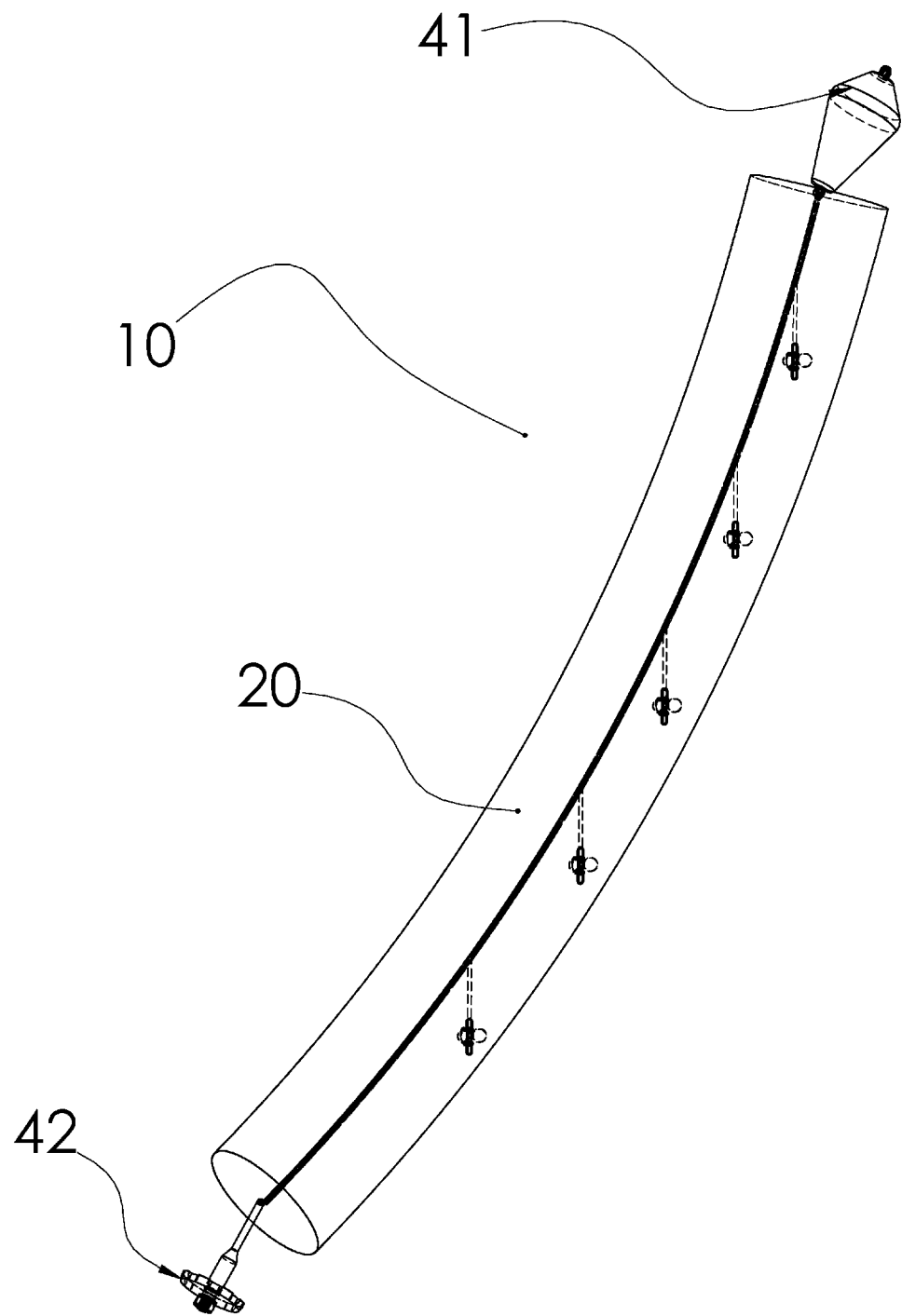
FIG. 1A is a schematic diagram illustrating the typical embodiment depicted in FIG. 1 and including dotted lines illustrating one preferred shape of the "body of fluid" being surveyed by the apparatus.
Figure 1B:
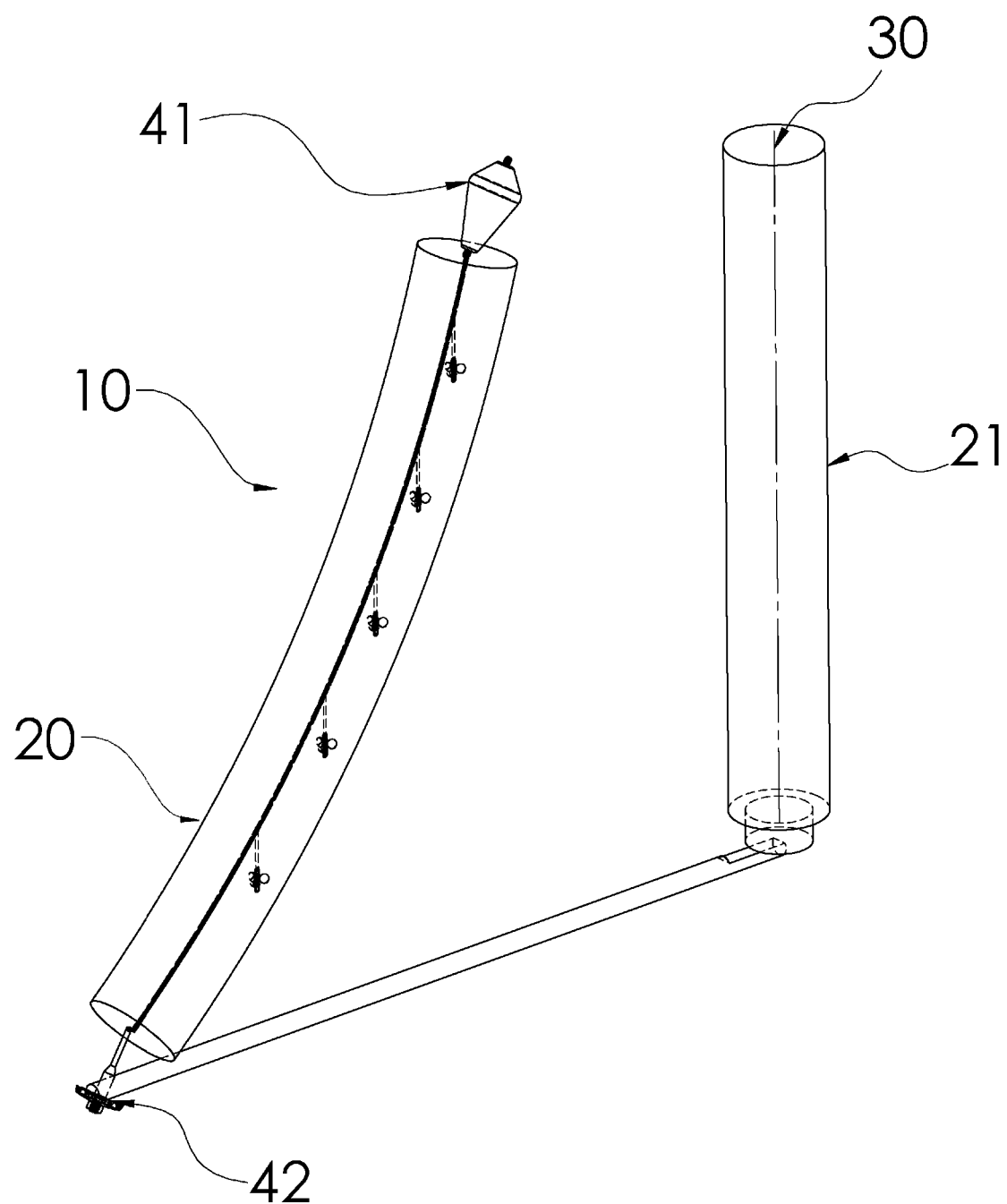
FIG. 1B is a schematic diagram illustrating the typical embodiment depicted in FIG. 1A and including in dotted lines one preferred shape of an "additional volume of fluid" associated with an axis that transects the body of fluid.
Figure 2:
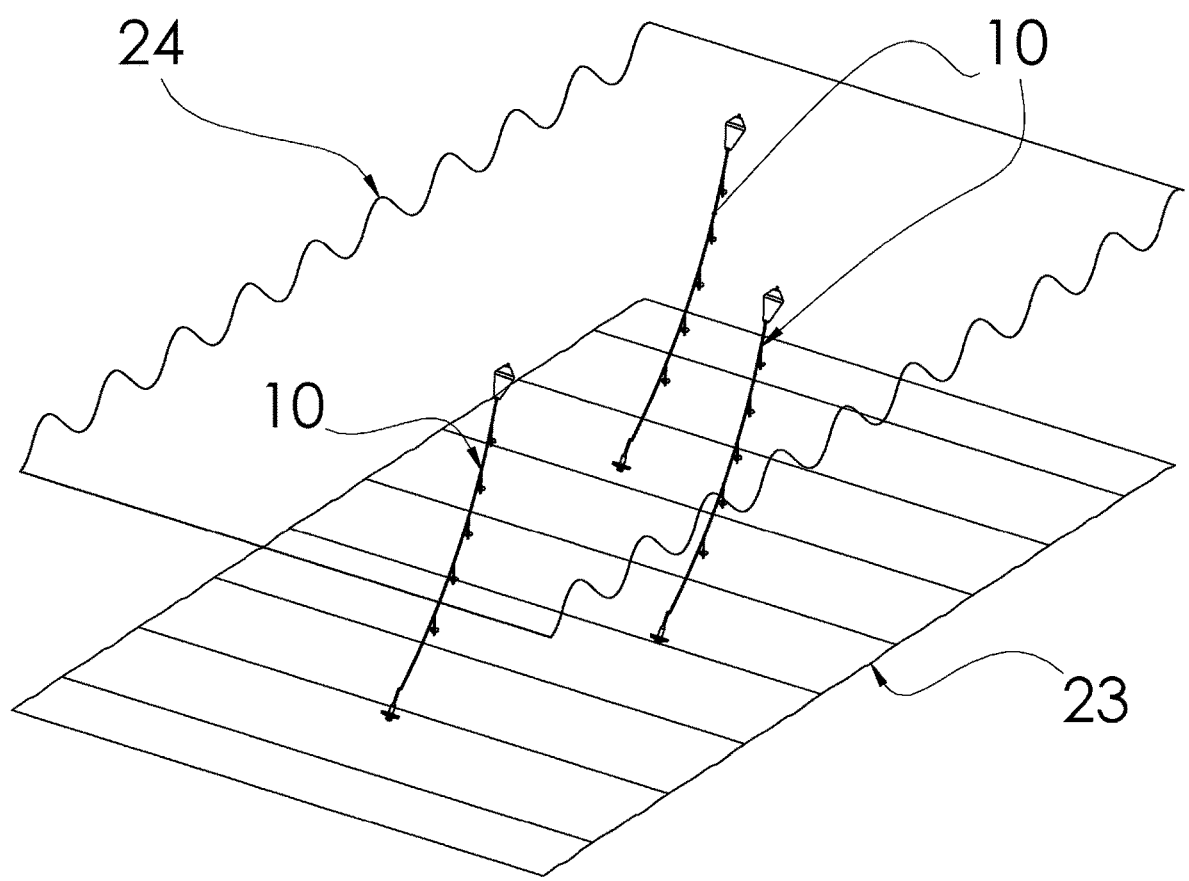
FIG. 2 is a diagram illustrating a plurality of apparatuses deployed in a volume of hydro-dynamic fluid/sea.
Figure 3A:
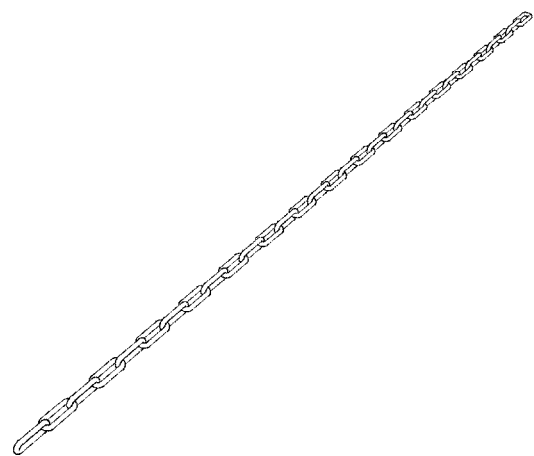
FIG. 3 is a diagram illustrating a series of different potential configurations for a survey member suitable for use in preferred embodiments of the invention.
Figure 3B:
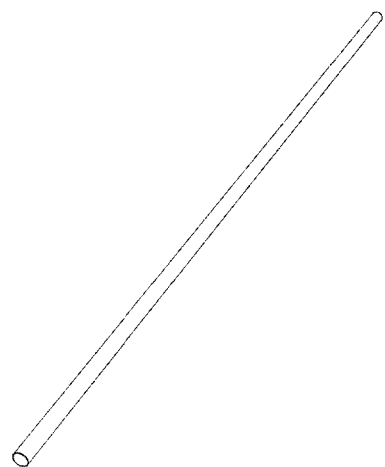
Figure 3C:
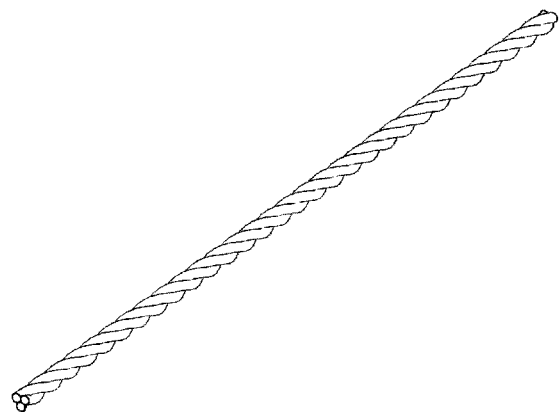
Figure 3D:
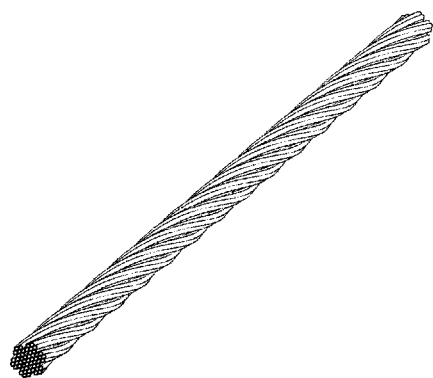
Figure 3E:
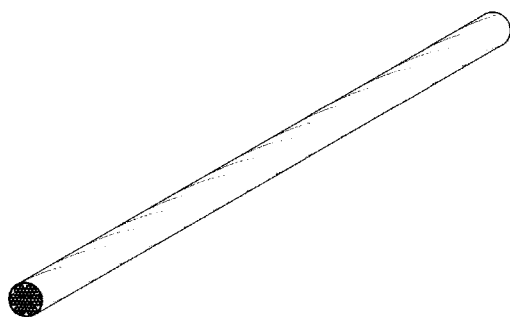
Figure 3F:
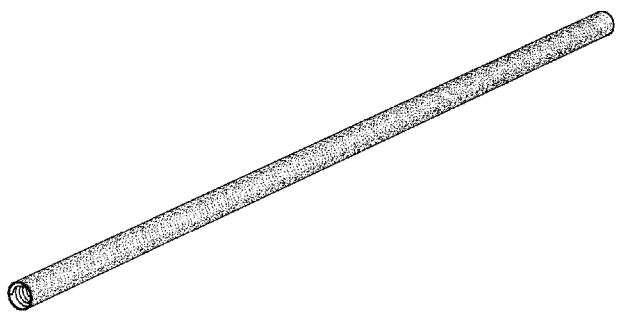

The body of fluid 20 further includes an additional volume of fluid 21 associated with the axis 30. The additional volume of fluid 21 is preferably or alternatively in fluid communication with the body of fluid 20 or is adjacent the body of fluid 20. (refer to FIG. 1B)

The association between the instrumentality or instrumentalities 60 and the survey member 40 is spatial. Some such embodiments provide that there is nothing physically connecting or affixing the one or more instrumentality 60 to the survey member 40. In some such embodiments, the at least one instrumentality 60 is connected to the first or second position defining arrangement 41, 42, or to some other item.

Preferably, the association between the instrumentality or instrumentalities 60 and the survey member 40 is physical. In some such embodiments, the instrumentality or instrumentalities 60 are connected (whether releasably, fixedly, or integrally) to the survey member 40 between the first and second position defining arrangements 41, 42. Embodiments of the apparatus 10 that have two or more instrumentalities 60 provide that the instrumentalities may be evenly or unevenly spaced apart between the first and second position defining arrangements 41, 42.

In some embodiments where the association is physical, at least one of the instrumentalities 60 is connected via an elongate member 50, such as, for example, a section of rope. Preferably, the elongate member 50 is adapted so that the weight of the instrumentality 60 causes it to hang in a substantially vertical orientation, even in circumstances where the survey member 40 is on an angle to, for example, the vertical. This could occur, for example, when the apparatus 10 is deployed in a body of fluid 20 with a current flowing in one direction, such that the first and second position defining arrangements 41, 42 are offset from one another in a vertical plane because the current causes one of the two position defining arrangements 41, 42 to move away from the vertical plane in which the other position defining arrangement is positioned at a given point in time. (refer to FIG. 1)

The surveyed body of fluid 20 adjacent the axis 30 is preferably a column shape, whether regular or irregular. (refer to FIG. 1A) In such embodiments, and in some others, the axis 30 is a longitudinal central axis about which the column is formed. However, it should be appreciated that other shapes and/or configurations for the body of fluid 20 are within the scope of the invention. In broad terms the shape and/or configuration of the body of fluid 20 is defined by a volume of fluid surrounding the axis 30, the approximate metes and bounds of the volume of fluid being determined as relative to the metes and bounds of fluid that can be surveyed by the at least one instrumentality 60.

In some preferred embodiments, the axis 30 is substantially a straight line and the survey member 40 is adapted to be substantially parallel to the axis 30. In some other preferred embodiments, the survey member 40 is adapted to substantially overlap with the axis 30. In some further preferred embodiments, the survey member 40 forms the axis 30.

Depending on the number and type of instrumentality/ies 60 and the specific survey member 40 used, the shape and size of the apparatus 10 can vary. Preferably, the environments in which the apparatus 10 can be deployed varies from large bodies of fluid, such as would be found in oceans, lakes, rivers or open air, to narrow or restrained bodies of fluid, such as might be found in spaces such as estuaries, tunnels or caves.

In some embodiments, wherein an instrumentality 60 surveys by means of fluid flow through, for example, an aperture or means for receiving survey fluid, such as, through a pipeline or in fluid communication with a venturi or other orifice-based meter, it is preferred that the instrumentality 60 is oriented so as to receive fluid flow substantially directly into the aperture. In some such embodiments, a fin member or rudder like mechanism, or other suitable orientation mechanism, is further included in the apparatus 10 so as to aid in orienting such instrumentality 60 to receive fluid in a manner enabling survey.

Some examples of instrumentalities 60 that survey by reference to fluid flow include anemometer-based instrumentalities which convert circulation speed into a flow velocity measurement. In some such embodiments, the anemometer is preferably oriented so as to receive fluid flow in substantially the same plane as the direction of rotation. In other such embodiments, the anemometer is oriented so as to receive fluid flow substantially perpendicularly to the plane of direction of rotation.

Figure 4A:
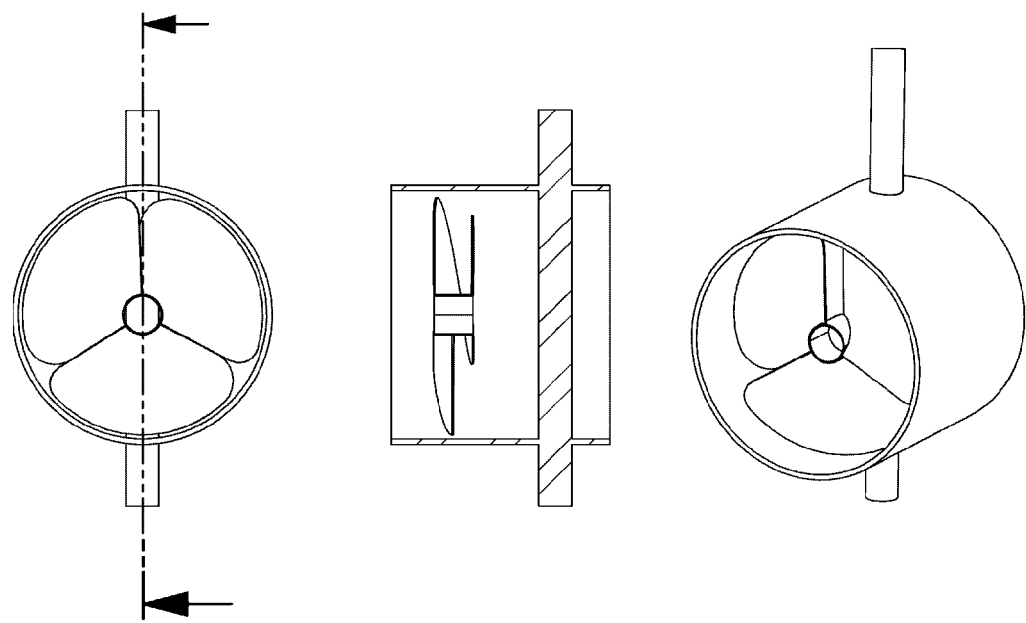
FIG. 4A depicts a fan like instrumentality with blades.

In some preferred embodiments, suitable anemometers are fan-like with blades, cups or both. (refer to FIG. 4A) Fluid flowing toward a face of the fan-like anemometer applies pressure to fan blades or fan cups causing the fan-like anemometer to rotate. The instrumentality 60 calculates velocity of fluid flow based on the speed of the fan-like anemometer's rotation.

Fluids for which anemometer-based instrumentalities are preferred include liquid and gas. As would be appreciated by persons skilled in the art, not all anemometer-based instrumentalities survey by reference to speed of rotation.

Figure 4B:
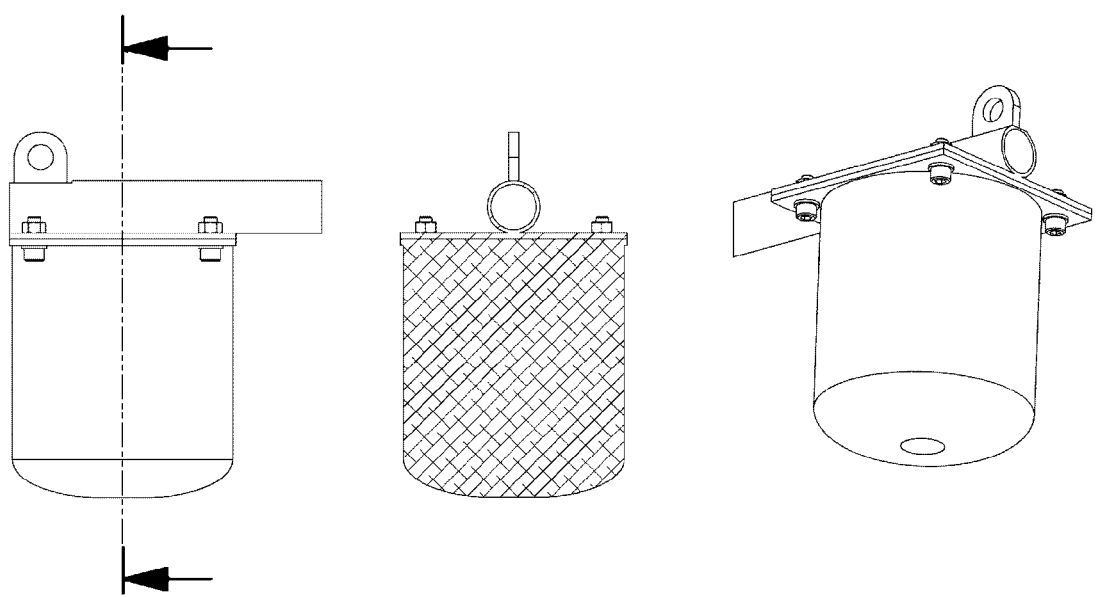
FIG. 4B depicts and ADCP.
Figure 4C:
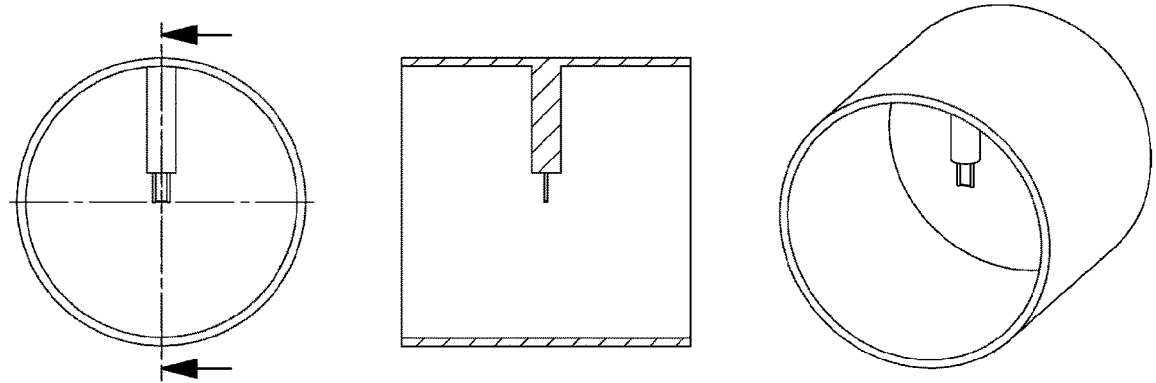
FIG. 4C depicts a hot wire anemometer.

Another example of an anemometer-based instrumentality that is adopted in some embodiments of the apparatus 10 is a hot-wire anemometer. (refer to FIG. 4C) Such an anemometer converts changes in resistance across the hot-wire, caused by variations in temperature resulting from fluid flowing past the hot-wire, into fluid velocity measurements. Other similarly-based anemometers, or systemic variations to them, are constant current anemometers, constant voltage anemometers, constant temperature anemometers, and pulse-width modulation anemometers.

Figure 4D:
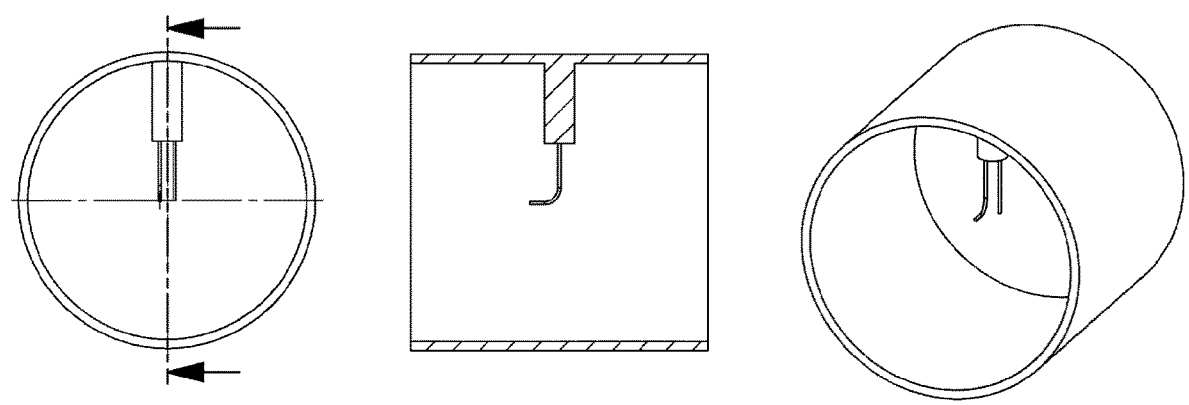
FIG. 4D depicts a pitot port/static port system.
Figure 5:
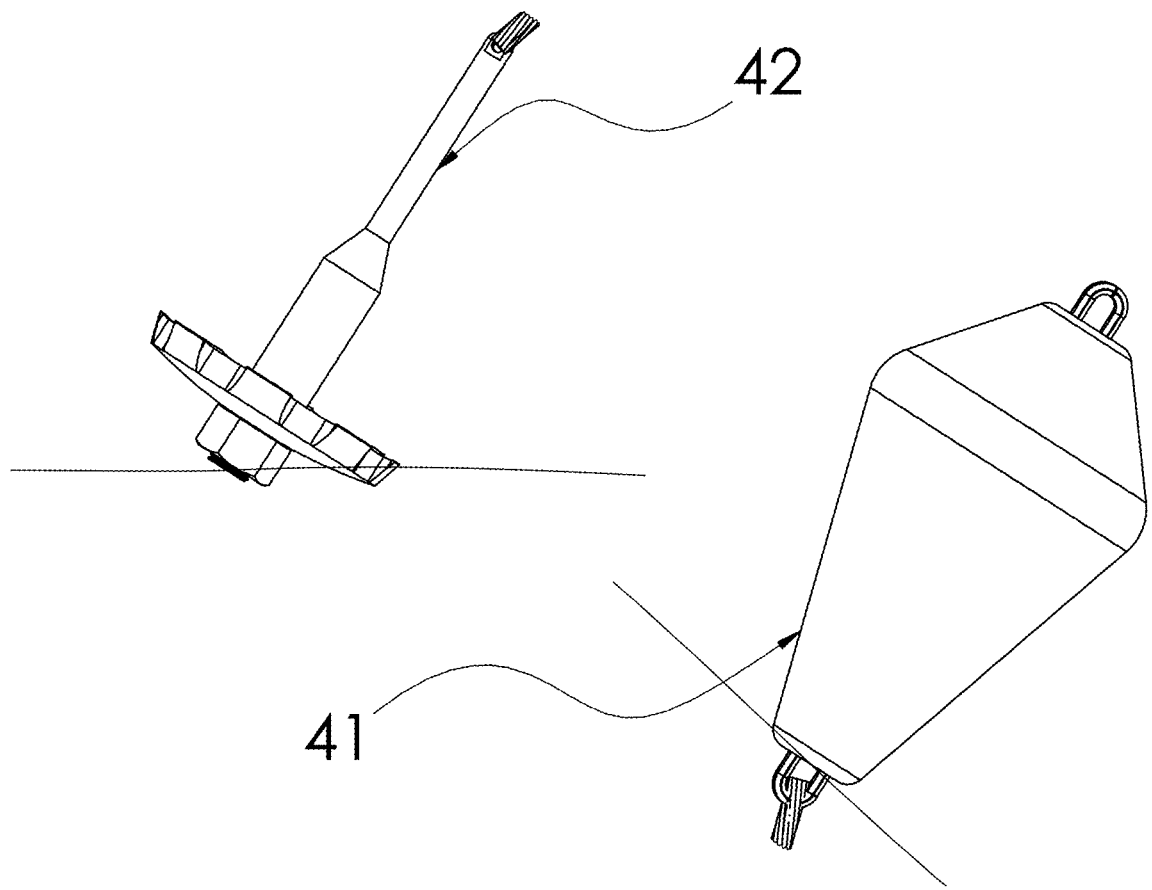
FIG. 5 is a diagram illustrating a series of different potential configurations for a position defining arrangement suitable for use in preferred embodiments of the invention.

Pitot tube static anemometers are yet still further examples of suitable instrumentalities 60 that are adopted by the invention. (refer to FIG. 4D) Typically, such anemometers include a tube with a static port and a pitot port. Preferably, the pitot port measures total pressure at an open mouth of the tube oriented to face incoming fluid flow, and the static port measures static pressure from apertures along a side of the tube. The static pressure value is then subtracted from the total pressure measurement to isolate the dynamic pressure. Since dynamic pressure is defined as one half of the fluid density multiplied by the fluid velocity squared, the fluid velocity value can be determined by reference to the dynamic pressure measurement.

Some preferred and alternative embodiments disclose that an ADCP is adopted as one instrumentality 60. (refer to FIG. 4B) Typically, an ADCP may be adopted as one or more instrumentality/ies 60 in embodiments of the apparatus 10 adapted for deployment where the body of fluid 20 is a liquid. ADCPs are commonly used in such circumstances to measure fluid flow characteristics in the ocean or in other large bodies of liquid. ADCPs can measure the water velocity across a lengthy water column in defined and regular bins throughout that column. They typically have measurements that are taken and saved locally in the ADCP device. By adopting an ADCP as one instrumentality 60, the typical capabilities of the ADCP can be extended/expanded by acquiring and transmitting ADCP sensor data to remote data storage facilities in real-time, batched or on-demand.

Figure 6:
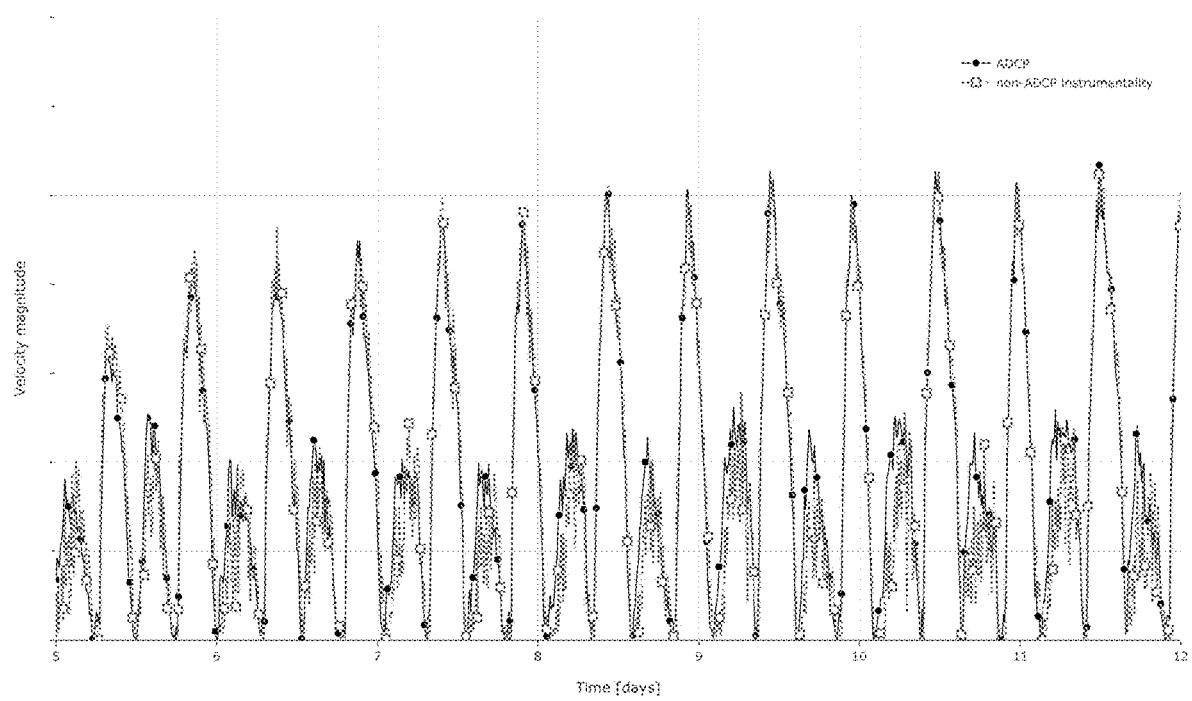
FIG. 6 shows a comparison of velocity data taken, over the course of one week, from flow measure by an ADCP (line with solid circle) and from flow measure by one embodiment of the apparatus of the present invention (dotted line with outlined square).

However, other instrumentalities 60 can also provide data commensurate with data that might be taken by an ADCP form of instrumentality 60. FIG. 6 shows a comparison of velocity data taken, over the course of one week, from flow measure by an ADCP (line with solid circle) and from flow measure by one embodiment of the apparatus of the present invention (dotted line with outlined square).

Figure 7:
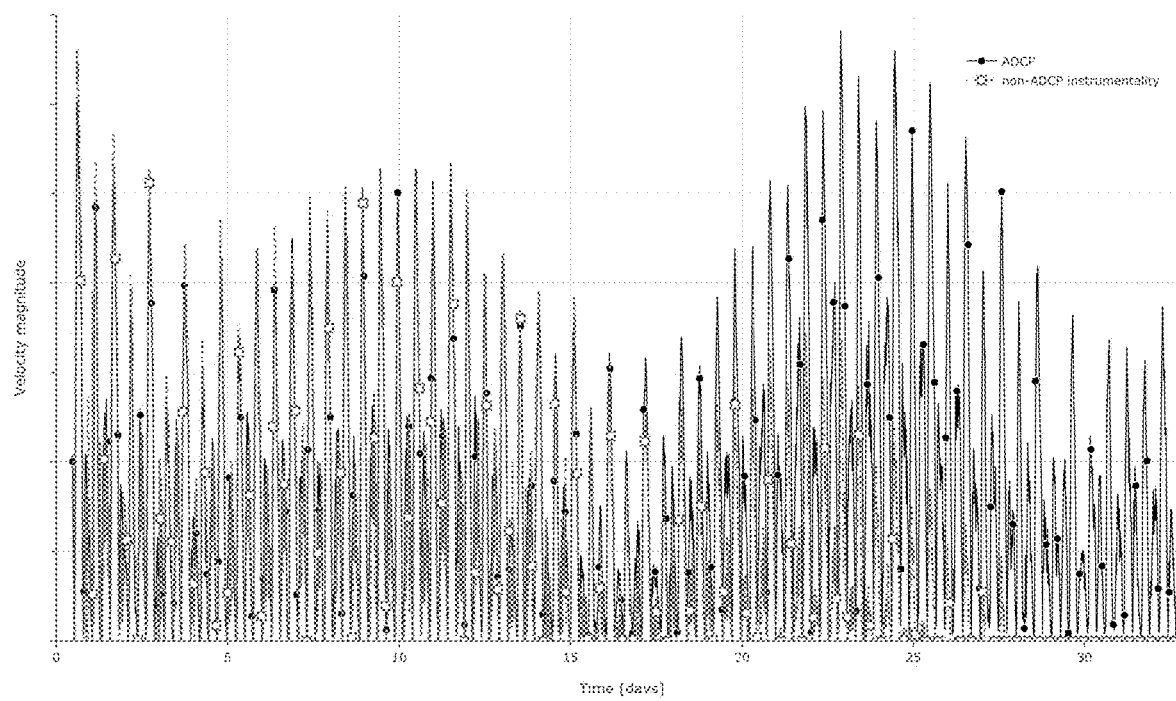
FIG. 7 shows a comparison of velocity data taken, over the course of approximately 6.5 weeks, from flow measure by an ADCP (line with solid circle) and from flow measure by one embodiment of the apparatus of the present invention (dotted line with outlined square). This figure shows the potential effects of bio-fouling on one embodiment of an apparatus according to the present invention over a substantially longer period of time than recorded in FIG. 6.

FIG. 7 shows a comparison of velocity data taken, over the course of approximately 6.5 weeks, from flow measure by an ADCP (line with solid circle) and from flow measure by one embodiment of the apparatus of the present invention (dotted line with outlined square). This figure shows the potential effects of bio-fouling on one embodiment of an instrumentality 60 over a substantially longer period of time than recorded in FIG. 6. Regular reconditioning or use of suitable anti-fouling coatings/treatment of embodiments of the invention such as the one from which the data in this figure was taken can substantially delay the effect of bio-fouling.

As the instrumentality/ies 60 may vary from one embodiment to another, the apparatus 10 can be used to survey not only characteristics, such as those associated with movement of fluid, for example, velocity, but also characteristics such as those associated with the presence or absence of one or more composition/s or contaminant/s, and if present, the concentration of the/those composition/s or contaminant/s. In some embodiments, the composition of interest is known.

In some preferred and alternative embodiments, instrumentalities 60 adopted for the apparatus 10 so that further characteristics of the body of fluid 20 can be surveyed include:

| Instrumentality | Predetermined characteristic |
| --- | --- |
| Hydrometer | Salinity |
| Conductivity meter | Salinity |
| Water quality meter | Dissolved oxygen (DO) |
| Water quality meter | Dissolved carbon dioxide |
| Water quality meter | Potential of hydrogen (pH) |
| Water quality meter | Turbidity/suspended solids |

In some further embodiments, other characteristics of the body of fluid 20, such as viscosity, temperature, and density may also be surveyed. It will be appreciated by persons skilled in the art that any one of a number of characteristics of a body of fluid 20 can be surveyed with suitable sensing technology contained in or adapted to engage with an instrumentality 60. In other words, the apparatus 10 of some preferred and alternative embodiments is adapted to survey a body of fluid 20 in relation to a number of different characteristics. In some such embodiments, each instrumentality 60 includes a sensor or survey means adapted to sense or survey a particular characteristic. In other embodiments, an instrumentality 60 can incorporate or engage with more than one sensor or survey means, in which case such instrumentality 60 is capable of surveying multiple characteristics in the body of fluid 20.

Once deployed, the positions of the instrumentalities 60 relative to the apparatus 10 preferably remains unchanged during the predetermined period. In some embodiments, the instrumentalities 60 are secured to the survey member 40 so as to inhibit substantial angular or dimensional movement between the instrumentalities 60 and the survey member 40.

The apparatus 10 is used to survey at a range of depths or heights at one predetermined location in the body of fluid 20. In some such preferred embodiments, traversing a target range of depth is preferably achieved with the axis 30 transecting the body of fluid 20 substantially perpendicularly to a bottom plane 23 or top plane 24 of the body of fluid 20. (refer to FIG. 1)

The axis 30 might not be perpendicular to the floor or top of the body of fluid 20 because a gradient is created by, for example, changes in velocity or other predetermined characteristics throughout the depth of the body of fluid 20 being surveyed.

The implementation of the position defining arrangements 41, 42 vary. In some embodiments, one end of the survey member 40 is positioned at the sea/river floor by anchor, buoyancy control device or weight, causing the first position defining arrangement 41 to be substantially fixed or to substantially rest on the sea/river floor where the anchor, buoyancy control device or weight, comes to rest or engages with the floor. Some embodiments of the apparatus 10 do not require an end of the survey member 40 to touch or be adjacent the floor. In such embodiments, the anchor, buoyancy control device or weight, is adapted to define the position of the first position defining arrangement 41 by applying a suitable amount of weight, downward buoyancy, or increased density, so as to maintain the first position defining arrangement 41 at the preferred relative depth.

Figure 8A:
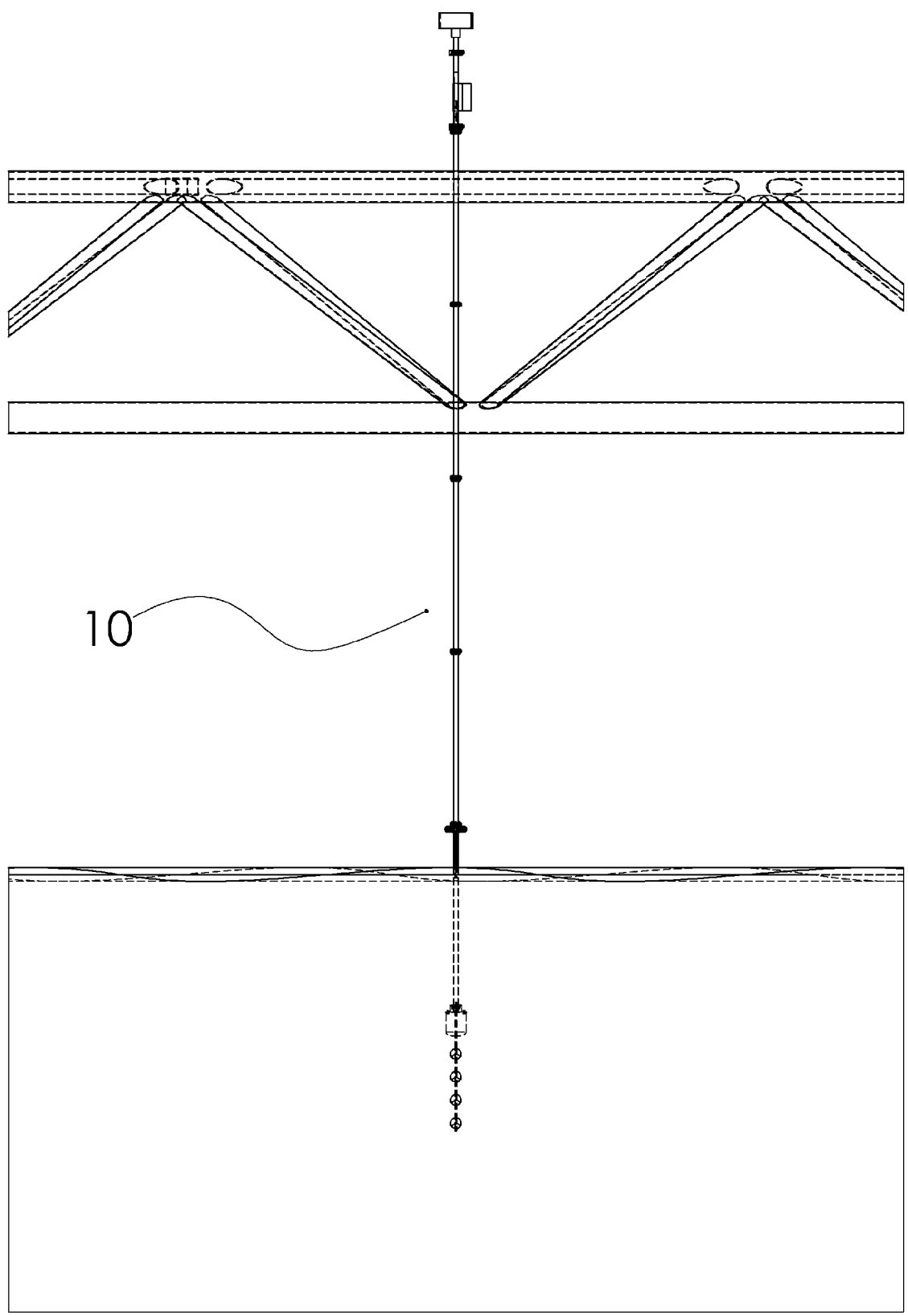
FIG. 8A depicts a deployed position of an apparatus from a wharf or jetty.
Figure 8B:
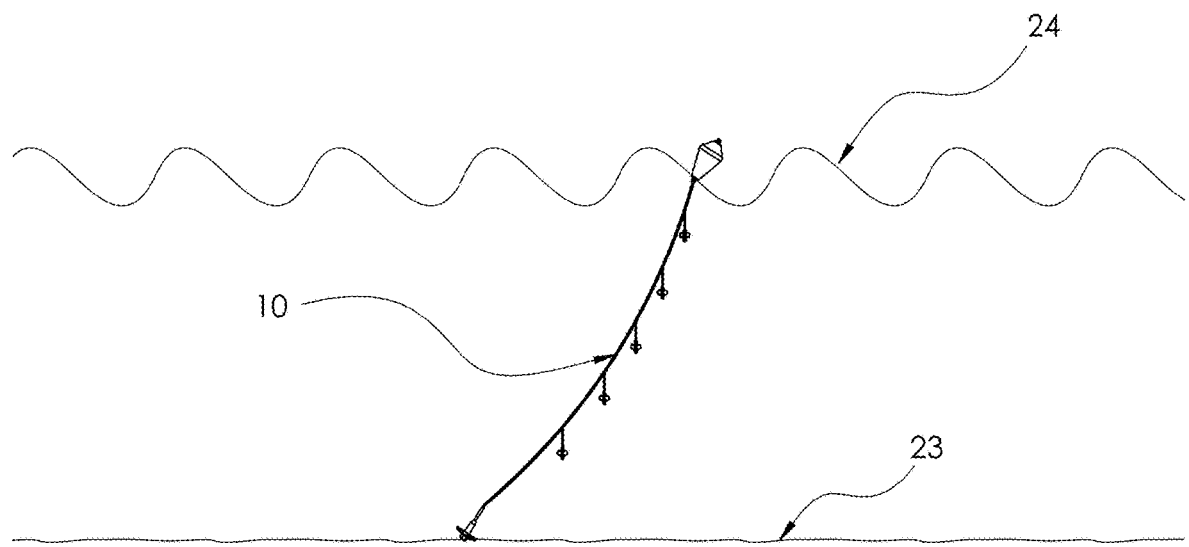
FIG. 8B depicts a deployed position of an apparatus from liquid surface to liquid floor.
Figure 8C:
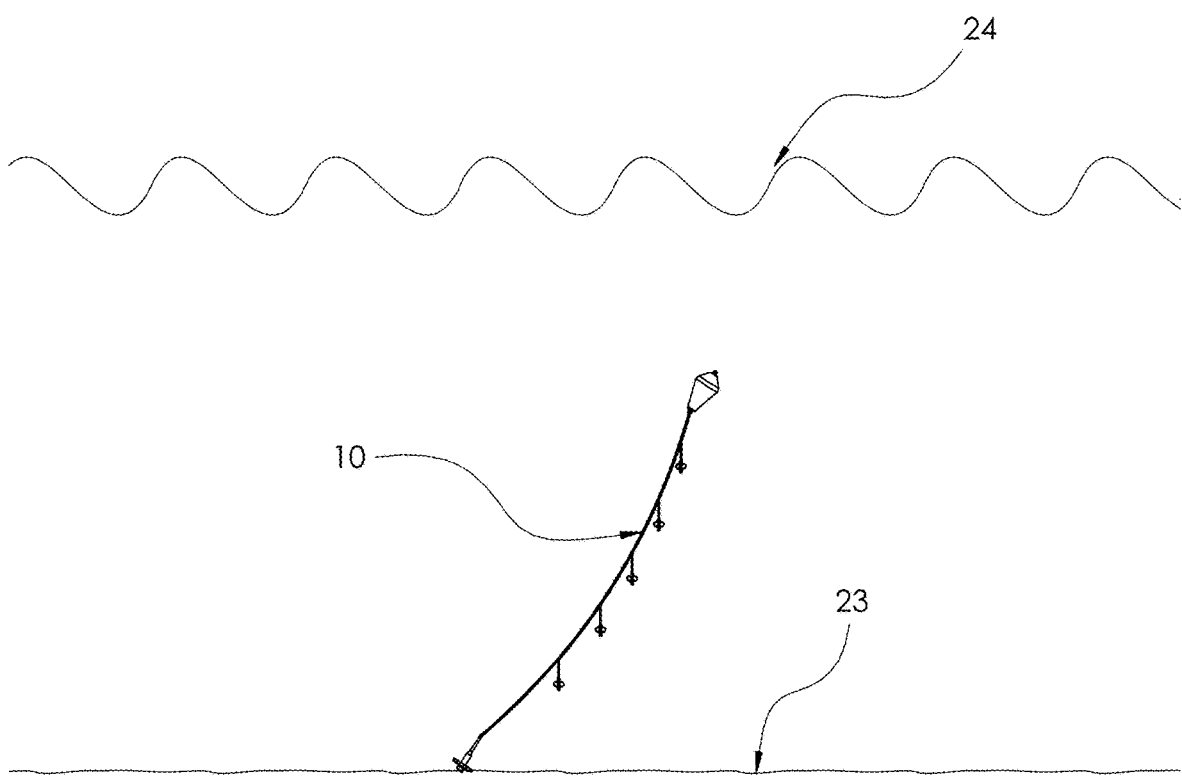
FIG. 8C depicts a deployed position of an apparatus from liquid floor to below liquid surface.
Figure 8D:
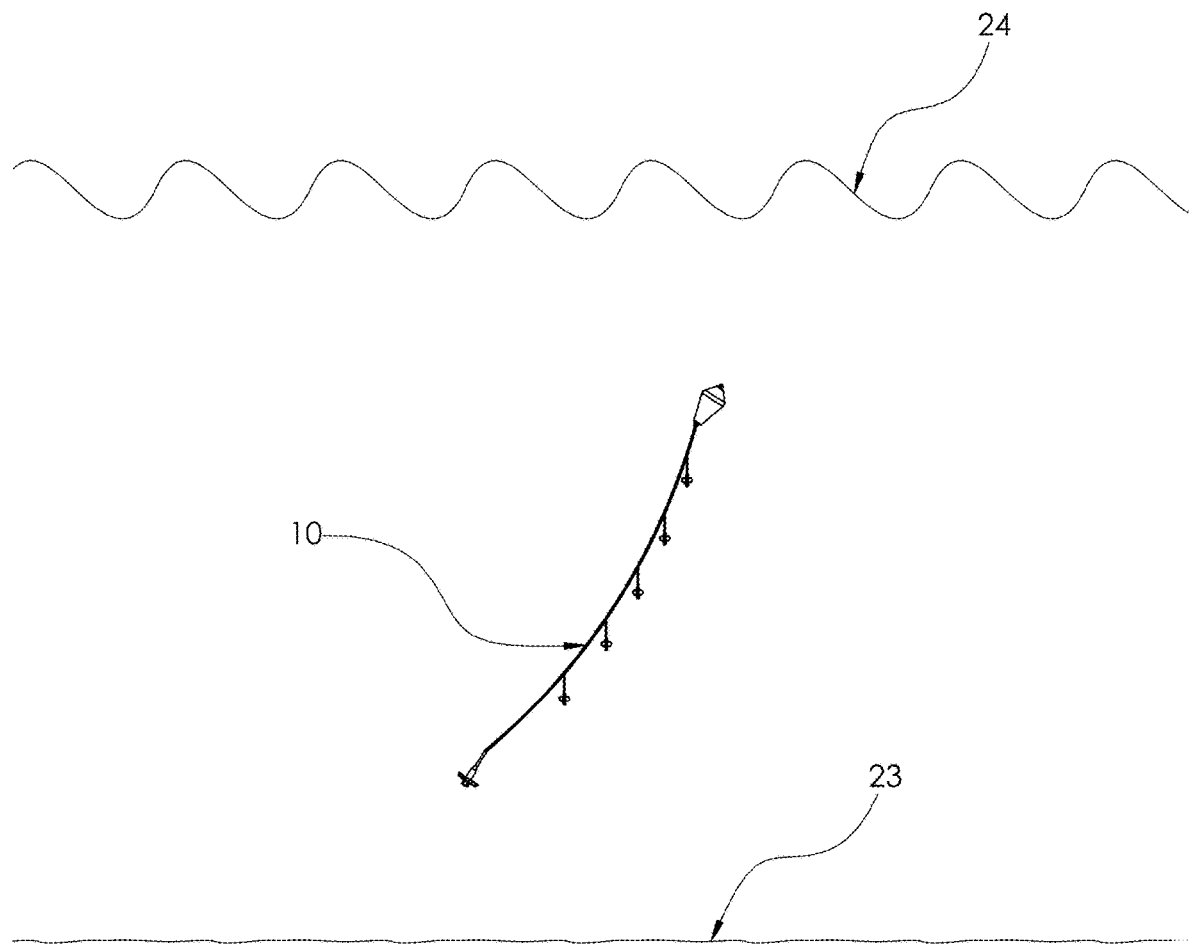
FIG. 8D depicts a deployed position of an apparatus drifting between liquid surface and liquid floor.

The implementation of the second position defining arrangement 42 includes securing the other end of the survey member 40 to a superstructure above or otherwise adjacent a surface of the body of fluid 20, such as a wharf or a bridge. (refer to FIG. 8A) In some other preferred embodiments, the second position defining arrangement 42 is implemented by a float, buoyancy control device or buoy, adapted to maintain an end of the survey member 40 at or adjacent a surface of the body of fluid 20 or at a predetermined distance below the surface. Some embodiments of the apparatus 10 do not require an end of the survey member 40 to touch or be adjacent the surface. In such embodiments, the float, buoyancy control device or buoy, is adapted to define the position of the second position defining arrangement 42 by applying a suitable amount of buoyancy, upward buoyancy, or decreased density, so as to maintain the second position defining arrangement 42 at the preferred relative depth.

In one preferred embodiment, a buoyancy control device means a flotation device or flotation means, such as a buoy, or any other device or means capable of providing buoyancy, or resisting or overcoming a buoyancy counter-force, such as that provided by a weight or other object or means that does not float or that resists or overcomes flotation. In another preferred embodiment, a buoyancy control device means a weight, such as an anchor, or any other device or means that sinks or is capable of resisting or overcoming buoyancy. In other preferred and alternative embodiments, buoyancy control device means a device or means adapted to regulate a depth at which the device or means achieves neutral buoyancy or substantially neutral buoyancy, such as, for example, as is sometimes called, a buoyancy compensator. In other preferred and alternative embodiments, buoyancy control device means a device or means adapted to control and/or maintain the vertical positioning of the apparatus 10 in the body of fluid 20.

Persons skilled in the art will appreciate from the description that the apparatus 10 of preferred and alternative embodiments can be adapted to take on different relative depths within the body of fluid 20 that they are respectively surveying. In some embodiments, for example, the first position defining arrangement 41 is positioned on or adjacent the sea/river bed.

The first position defining arrangement 41 can also be positioned at a predetermined distance above the sea/river floor or at a predetermined depth. In some such embodiments, the second position defining arrangement 42 can be adapted to position the other end of the survey member 40 at or adjacent the surface of the body of fluid or at a predetermined depth below the surface. Accordingly, the apparatus 10 can be deployed at or adjacent the surface of the body of fluid 20, at or adjacent the floor of the body of fluid 20.

The apparatus 10 can be deployed interposed between the surface and the floor of the body of fluid 20. In some such embodiments, the velocity of the fluid or currents in or adjacent the body of fluid 20 may carry the apparatus 10.

In some preferred embodiments, the apparatus 10 is inhibited from moving with the flow of the body of fluid 20.

A buoyancy control device at at least one of the position defining arrangements 41, 42 is adapted to actively (whether periodically, constantly or on demand) effect variation of the depth of the apparatus 10.

In some deployed arrangements of the apparatus 10, for example, an end of the apparatus 10 closest to the surface of the body of fluid 20 (for present exemplary purposes only, 'an upper end') may be submerged below the surface. In some such deployed arrangements, it may be desirable to periodically or on demand have the upper end of the apparatus 10 at or above the surface of the body of fluid 20. For such occasions, the buoyancy control device at the position defining arrangement 41 adjacent the upper end of the apparatus 10 is adapted to actively cause the upper end of the apparatus 10 to move to that position by decreasing the relative density of that buoyancy control device.

By way of further example, in other deployed arrangements of the apparatus 10 (refer to FIG. 8), an end of the apparatus 10 closest to the floor of the body of fluid 20 (for present exemplary purposes only, 'a lower end') may be situated above the floor. In some such deployed arrangements, it may be desirable to periodically or on demand have the lower end of the apparatus 10 against the floor of the body of fluid 20. For such occasions, the buoyancy control device at the position defining arrangement 42 adjacent the lower end of the apparatus 10 is adapted to actively cause the lower end of the apparatus 10 to move to that position by increasing the relative density of that buoyancy control device.

The position defining arrangements 41, 42 can each have or be a buoyancy control device adapted to actively (whether periodically, constantly or on demand) effect variation of the depth of the apparatus 10. In some such embodiments, the buoyancy control devices can work cooperatively to have the apparatus 10 move to a desired depth (whether periodically, constantly or on demand). However, it will be appreciated that in certain deployment arrangements, only one buoyancy control device may need to have the ability to actively effect variation of the depth of the apparatus 10. This is because one buoyancy control device that increases its relative density can do so sufficiently, in some circumstances, to counter the relative buoyancy of an opposing 'inactive' buoyancy control device thereby causing the apparatus 10 to descend in depth. Equally, one buoyancy control device that decreases its relative density can do so sufficiently, in some circumstances, to counter the relative weightiness of an opposing 'inactive' buoyancy control device thereby causing the apparatus 10 to ascend in depth.

The survey member 40 typically takes the form of a chain, rope, cord, cable, wire, thread, tube, hose or other similar such member. (refer to FIG. 3) Such forms of the survey member 40 are preferred because in such forms the survey member 40 is bendable and can change shape responsive to extraneous forces, such as, for example, flow velocity and gravity. In other embodiments, the survey member 40 is formed of a stiffer material or configuration, or one that is rigid.

In an environment, such as that found submerged in an ocean, river or lake, for example, objects can have a biomass build-up upon them over time. Biofouling can adversely affect functionality of the instrumentalities 60. In preferred, and some alternative, embodiments, the survey member 40, each or both position defining arrangements 41, 42, and each, some or all of the instrumentalities 60 are treated with a coating to retard the building-up process of biomass. In the preferred, and some alternative, embodiments, the coating is a non-toxic antifoul coating that, following application, leaves a surface to which it has been applied in a form inhibiting marine life from engaging/adhering to that surface, thereby inhibiting bio-fouling (or bio-mass build-up). Alternatively, inhibition of bio-failing could be achieved by adopting materials for one or more components of the apparatus that are impregnated with a material that has inherent anti-fouling properties. As previously explained in relation to FIG. 7, if the non-ADCP instrumentality 60 had been coated with or formed of material that has inherent anti-fouling properties, the drop in ability to record data over time that is reflected by the dotted line with outlined square could be inhibited.

The surveyed predetermined characteristic is associated with geographical information about the instrumentality 60. In some such embodiments, geographical information such as longitude and latitude, along with depth/height data are to be associated with the predetermined characteristic at different times. The apparatus 10 of some embodiments further includes a global positioning system (GPS) adapted to determine the geographical location of the apparatus 10.

Various embodiments of the invention further disclose one or more additional instrumentalities 60 or other sensors. For example, in some embodiments, an object sensor is included at or adjacent at least one of the position defining arrangements 41, 42. In some such embodiments, the sensor can feedback when a position defining arrangement has reached, for example, the sea/river bed or other surface of an object.

One or more instrumentalities or additional instrumentalities or sensors may be connected to, or be otherwise in association with, different components of the apparatus 10 or to or with an additional member which is connected to, or be otherwise in association with, different components of the apparatus 10.

For example, in some embodiments, a distal end of an additional elongate member 50 extends from the first position defining arrangement 41 where its proximal end is releasably connected. In some such embodiments, releasably connected to a distal end of the additional elongate member 50 is an instrumentality 60 in the form of an ADCP 62. The ADCP is preferably positioned so as to survey a predetermined characteristic 11, being fluid flow velocity, in an additional volume of fluid 21. In this example, the additional volume of fluid 21 is in overlapping fluid communication with the body of fluid 20. (refer to FIG. 1B)

However, in other examples, the length of the additional elongate member 50 may be such as to enable the additional volume of fluid 21 to be in non-overlapping fluid communication with the body of fluid 20. In some such examples, the instrumentality 60 releasably connected to the distal end of the additional elongated member is adapted to survey a predetermined characteristic of the additional volume of fluid 21, being a second body of fluid adjacent the body of fluid 20. Such embodiments effectively expand the reach of the apparatus 10.

Figure 9:
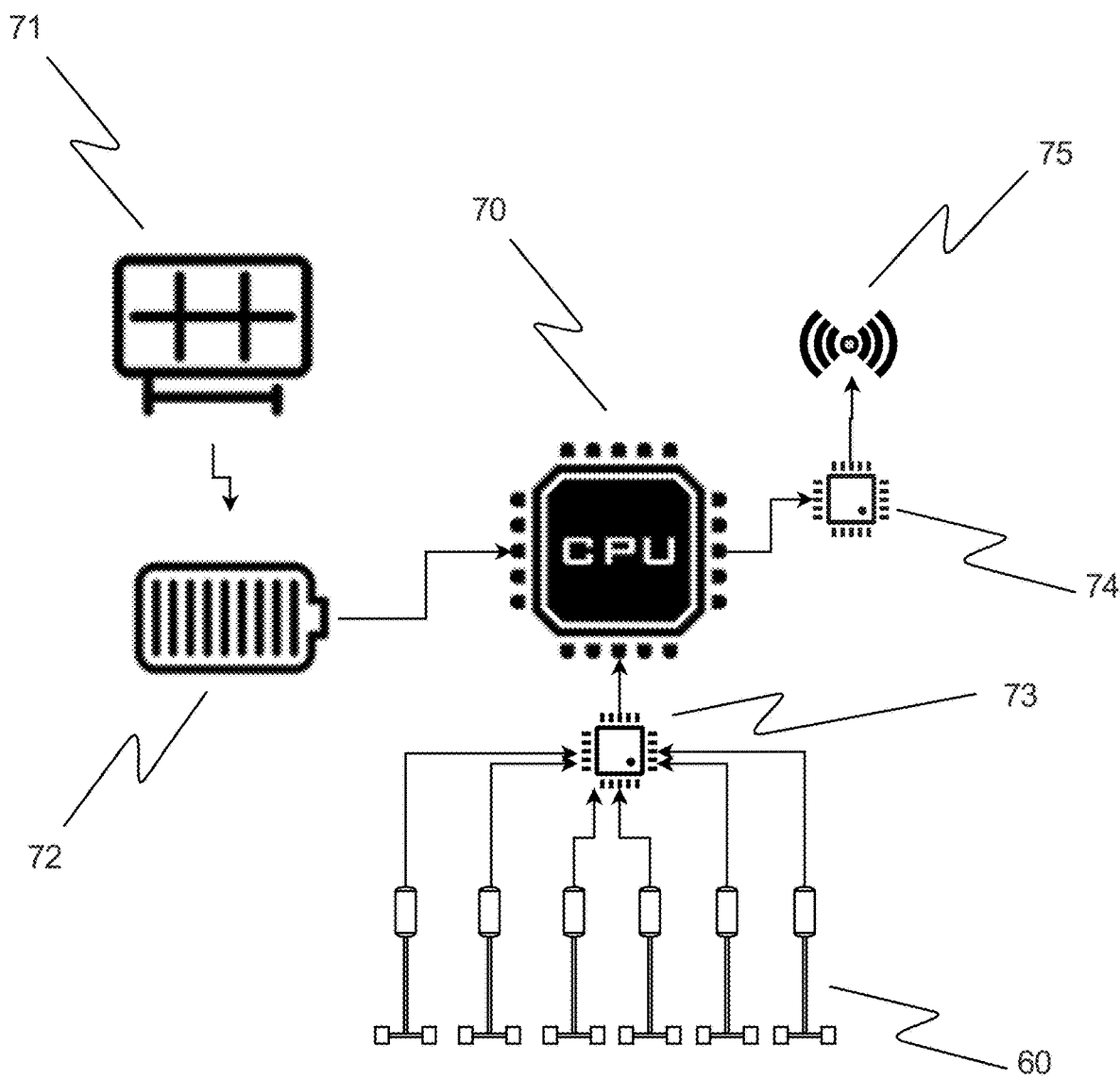
FIG. 9 provides a schematic diagram of some of the features of the electronics and data transfer arrangements for an apparatus according to one embodiment of the invention.

The electronics and data transfer mechanisms contained in the apparatus 10 in preferred and alternative embodiments are adapted to facilitate the flow of data through the apparatus 10 in so far as is necessary to transfer survey data obtained by the instrumentalities 60 (and in embodiments that have them, additional instrumentalities and/or sensors) to a central processing unit and data store. An example of an embodiment of the invention showing the electronics and data transfer mechanisms is shown in FIG. 9. They are also adapted to facilitate the flow of data from an external source in embodiments that are adapted to receive and process such data. The external source is discussed in more detail below. For now, the description remains focused on the electronics and data transfer mechanisms contained in the apparatus 10.

Physical data and/or power cables connect the instrumentalities 60, a subsidiary processing unit 73 and a central processing unit and a data store 70. In some such embodiments, the central processing unit and data store 70 are housed in or adjacent one of the position defining arrangements 41, 42. In other embodiments, the central processing unit and data store 70 are housed in or adjacent different components. For example, in some embodiments, the central processing unit is housed in or adjacent the first position defining arrangement 41 and the data store is housed in or adjacent the second position defining arrangement 42. In other embodiments, one or the other of the central processing unit and the data store is housed in or adjacent an instrumentality 60.

Typically, survey data flows from each instrumentality 60 to a subsidiary processing unit 73. The subsidiary processing unit 73 collates the survey data and transmits the data to the central processing unit and the data store 70. Survey data may also be transferred between the data store and the central processing unit, particularly in embodiments where raw survey data requires or would benefit from processing prior to storage or internal or external transfer. In some preferred embodiments, the central processing unit and the data store 70 transmit the data to a subsidiary processing unit 74, where the data is processed into suitable forms for transmission via a data transmitter 75 to an external source (not shown).

In some embodiments, the transfer of data internally as between the instrumentalities 60, subsidiary processing units 73, central processing unit and data store 70 is effected wirelessly. In some preferred embodiments, electrical power is obtained from solar charging panels 71 and stored in batteries 72. (refer to FIG. 9)

Figure 10A:
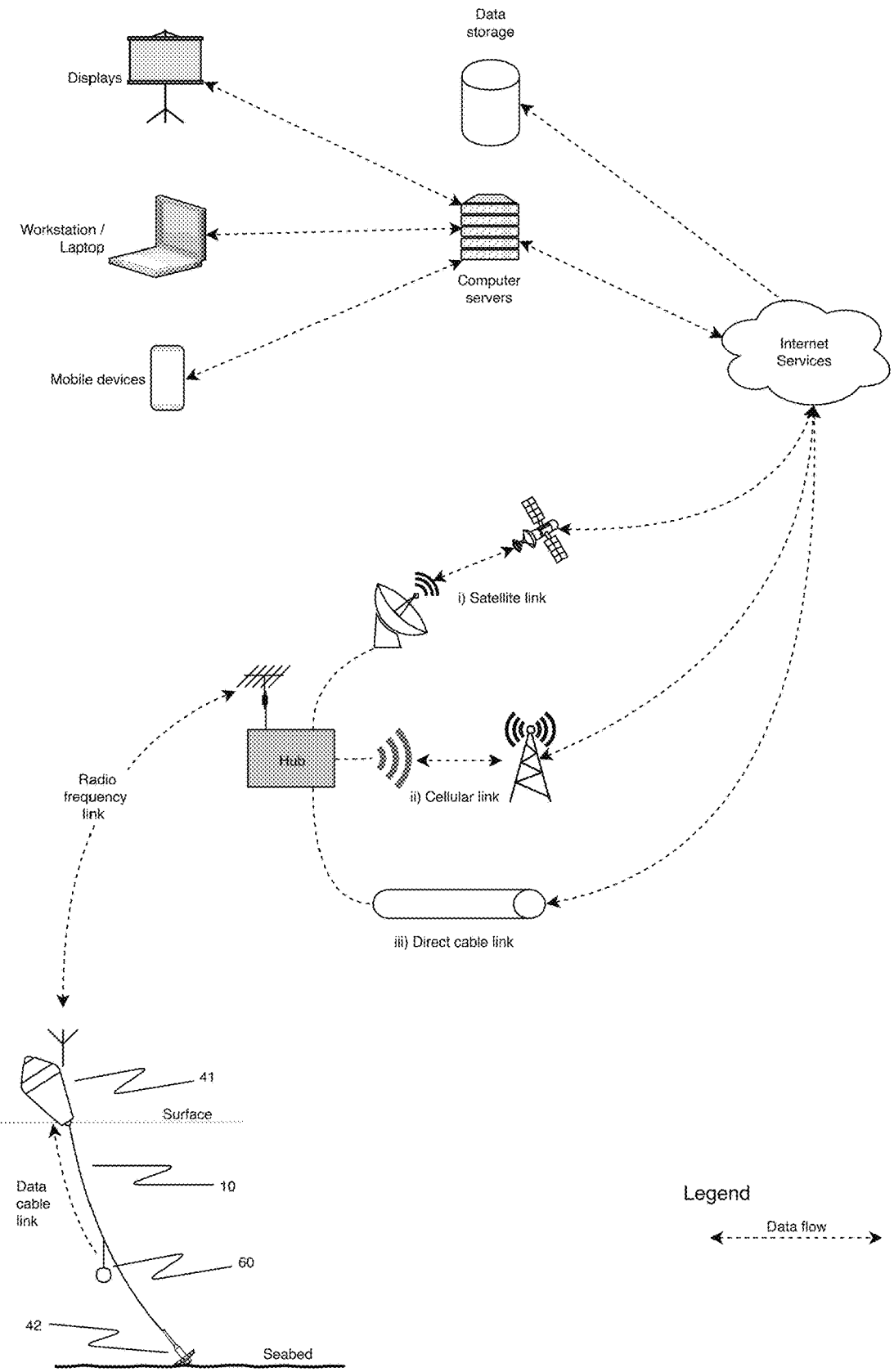
FIG. 10A provides a schematic illustrating the flow of data between an apparatus to an external source, being a hub, and between the hub and any one of a number of devices, such as displays, personal computers, and smart devices.
Figure 10B:
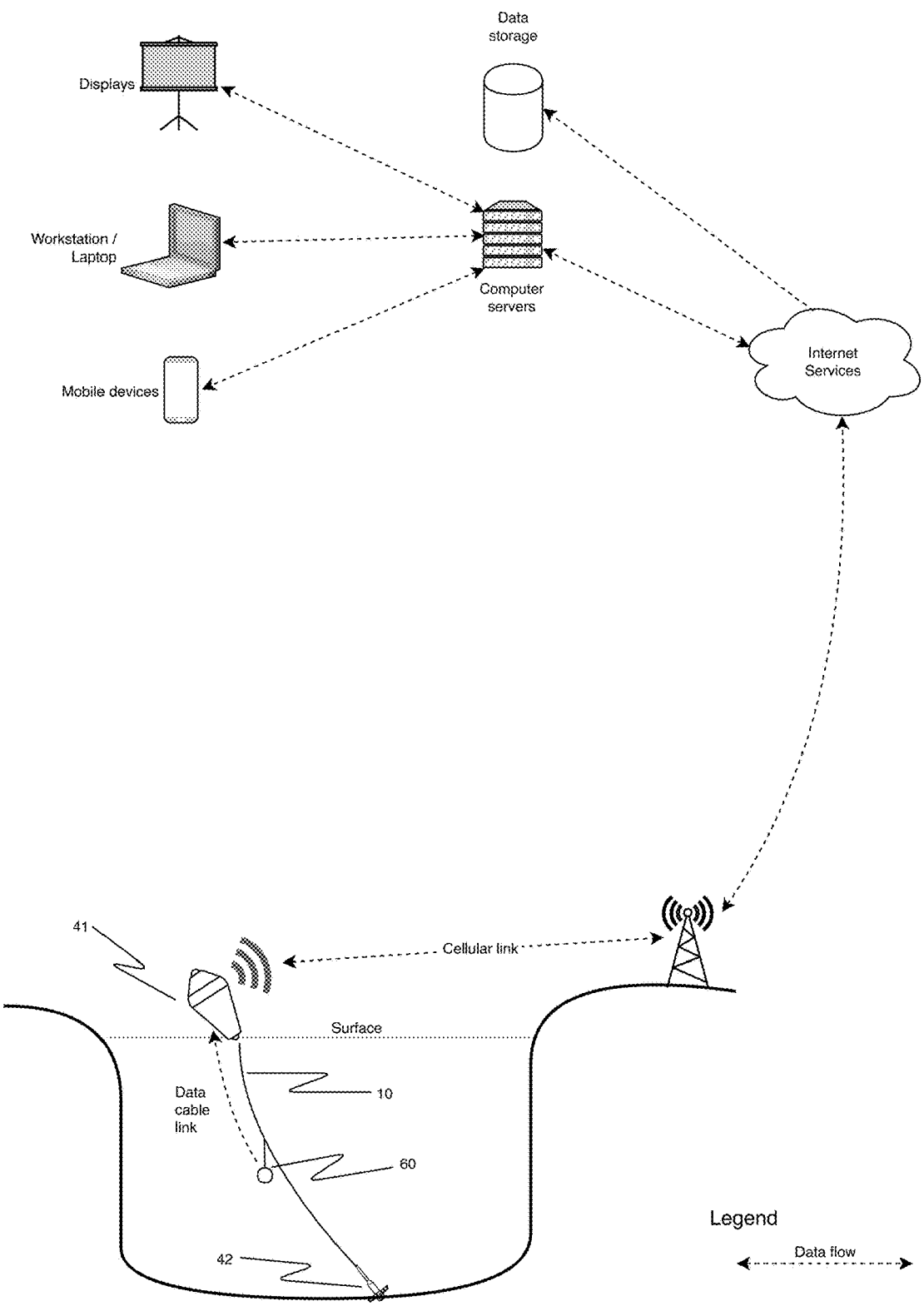
FIG. 10B provides a schematic illustrating the flow of data between an apparatus and any one of a number of devices, such as displays, personal computers, and smart devices.
Figure 10C:
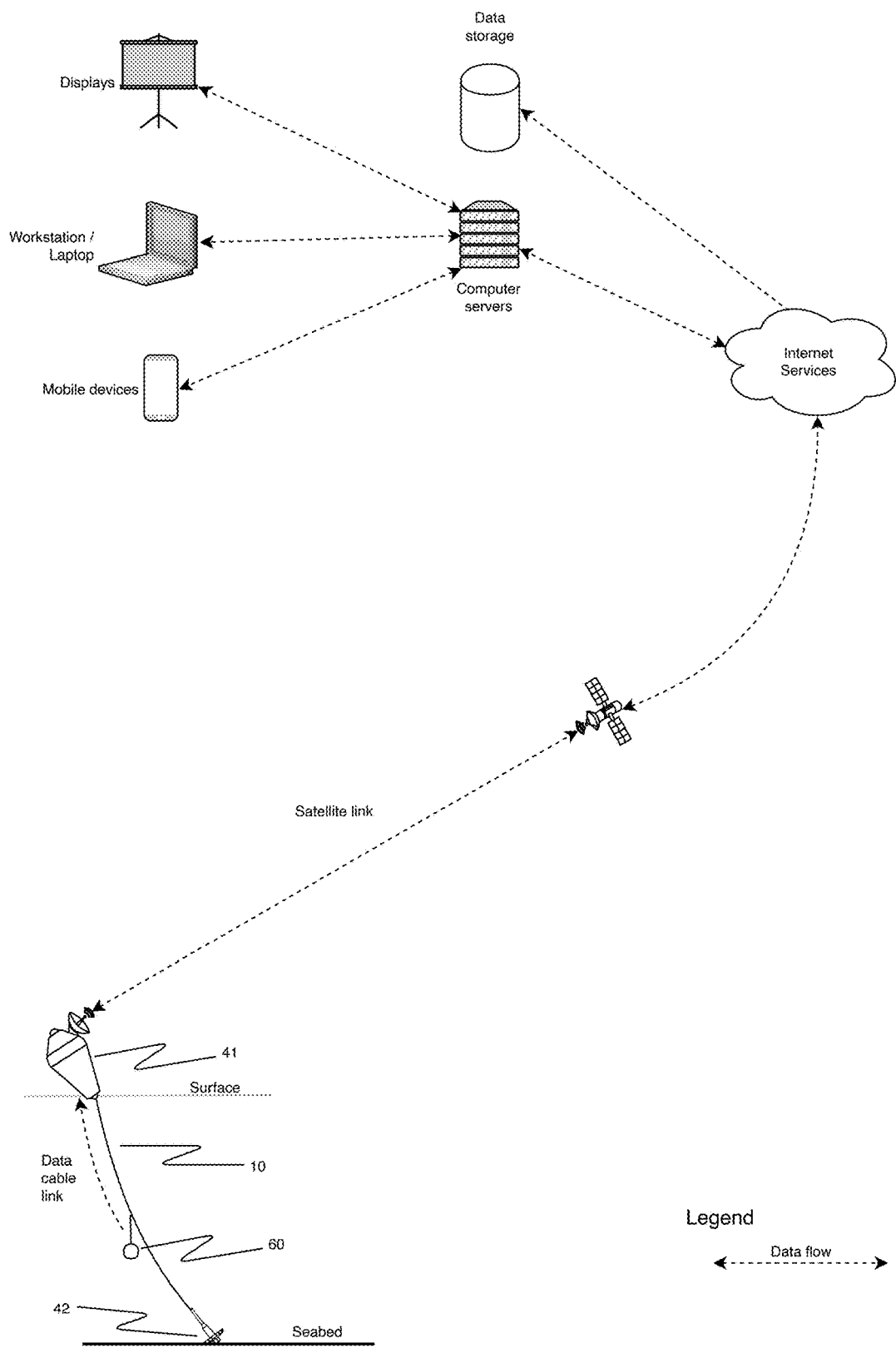
FIG. 10C provides a schematic illustrating another embodiment of the flow of data between an apparatus and any one of a number of devices, such as displays, personal computers, and smart devices.

The apparatus 10 further includes a data transmitter 75 for transmitting data between the apparatus 10 and an external source. The data transmitter 75 preferably transmits data over one or more available wireless data transmission means, including radio frequency link, cellular link and/or satellite link. (refer to FIGS. 10A, 10B, 10C) Persons skilled in the art will appreciate the flow of data, having been transmitted from the apparatus 10, between the various downstream data transmission/processing/displaying items depicted in FIGS. 10A, 10B and 10C.

In some embodiments the data transmission means is direct or physical cable link. However, such embodiments are typically (not necessarily always) reserved for circumstances wherein the apparatus 10 is within reasonable proximity to the external source so that a distance between the apparatus 10 and the external source can be spanned by the length of the direct or physical cable link. An example of such an embodiment is one in which the apparatus 10 is deployed from a wharf and is to remain relatively proximal to the wharf or where one of the position defining arrangements 41, 42 is fixed to a wharf or jetty (refer to FIG. 8A).

For embodiments of the invention adapted to be deployed in a large body of fluid 20, such as the ocean, and which are intended to remain relatively far from a wharf, jetty, vessel, physical structure, land, or otherwise at a remote site, the data transmitter 75 is preferably housed in or adjacent the position defining arrangement that is or is to be at or adjacent the surface of the body of fluid 20. Such a configuration permits the data transmitter 75 to be closest to the surface of the ocean, a location from where wireless transmission of data is more facilitated than if the data transmitter 75 is submerged in the ocean.

In embodiments of the invention wherein the data transmitter 75 is submerged because of, for example, the depth at which the apparatus 10 has been deployed, a signal amplifier, or some other means capable of enabling the transmission of data through liquid, may be used or may need to be adopted. In some such embodiments, as explained above, one or more buoyancy control devices could be configured such that a portion of the apparatus 10 where the data transmitter 75 is housed is actively elevated to the surface of the body of fluid 20 periodically, constantly or on demand.

The external source is preferably a hub or server adapted to enable data received from the apparatus 10 to be accessed, including via low frequency radio link, Wi-Fi, Bluetooth, or the internet. Measurement data from the instrumentalities 60 can be sent over a communication network to the hub, which in turn can facilitate transfer of the data to a data receiving and storage system, potentially over the Internet. In another preferred embodiment, the data can be requested from the remote storage system and the data is transferred from the instrumentality 60 via the hub over the communication network. The data can be accessed for further processing or analysis.

The hub or server is also adapted to transmit data to an apparatus 10 according to the invention. The data transmitted to the apparatus 10 includes control data, calibration data, self-test data, or, for example, on/off control data. The data transmitted to the apparatus 10 may, for example, be a data packet which, when executed, provides instruction to a buoyancy control device to effect a variation to the depth of the apparatus 10.

The apparatus 10 can, in some embodiments, further include a propulsion means. In some such embodiments, data transmitted from the external source may, for example, be a data packet which, when executed, provides instruction to the propulsion means to vary the location of the apparatus 10.

Survey data may be received, in preferred and alternative embodiments, by the external source or by otherwise physically accessing the apparatus 10. The surveyed data of preferred embodiments is collected by the apparatus 10 over a predetermined time period. However, the time period over which data is collected may be varied.

As the predetermined characteristics of the body of fluid 20 may reflect a pattern/s over a period of time, for example, the predetermined time period for survey is one week, one month, three months, one year, or more and, in some circumstances, could be as long as indefinite.

In some preferred embodiments, the data transmitter 75 is a wireless transmitter. The wireless transmitter also transmits status information for each instrumentality 60 including identification, working/error status, or geographical location information and a time stamp.

One or more of the elements of the apparatus 10 are powered by a power store, such as a battery. In some other embodiments, those one or more elements are powered by solar power, such as from solar panels mounted so as to collect solar power. In some other embodiments, the one or more elements are powered by an external power source, such as at a wharf, jetty or on land. In some further embodiments, the elements of the apparatus 10 receive power from more than one of these and other power sources.

The surveyed data obtained from an apparatus 10 can be used to assist in determining a suitable location for deployment of a fluid-based electricity generator based on fluid flow data, including, for example, velocity. As will be appreciated by persons skilled in the art, fluid flow data suitable for use in electricity generation includes, for example, air flow for wind generators and tidal and/or current flow for tidal power generators.

A plurality of apparatuses according to the invention can be deployed across or within an expansive body of fluid 20 so that surveyed data from multiple positions across or within the expansive body of fluid 20 can be obtained. Deployment of a plurality of apparatuses as such enables an assessment to be undertaken of a larger body of water than may be possible from one apparatus alone. Processing and analysis of the data from a plurality of apparatuses can also be used to assist in determining a suitable deployment site for a fluid-based electricity generator.

In some embodiments, when the apparatus 10 of preferred embodiments is deployed or to be deployed in a body of liquid, it is deployed in a free stream. The data obtained in FIGS. 6 and 7 was data obtained from a free stream.

According to another aspect, the present invention provides a method of surveying a predetermined characteristic within a body of fluid 20 adjacent an axis 30 that transects the body of fluid 20, the method comprising the steps of:
 deploying into a body of fluid 20 at least one apparatus 10 according to the first aspect of the invention; and
 obtaining survey data of the predetermined characteristic from one or more of the instrumentalities 60 over the predetermined time period.

Preferably, the apparatus 10 is inhibited in this aspect of the invention from moving with the flow of the body of fluid 20.

According to another aspect still, the present invention provides a method of surveying a predetermined characteristic within a body of fluid 20 adjacent an axis 30 that transects the body of fluid 20, the method comprising the steps of:

interposing between first and second position defining arrangements 41, 42 a survey member 40, the survey member 40 having at least one instrumentality 60 adapted to survey the predetermined characteristic of the body of fluid 20 adjacent the axis 30; and surveying with the instrumentality 60, over a predetermined period of time, the predetermined characteristic of the body of fluid 20 adjacent the axis 30.

Preferably, the apparatus 10 is inhibited in this aspect of the invention from moving with flow of the body of fluid 20.

According to a yet another aspect, the present invention provides a method of determining whether a potentially suitable site is a suitable site for operative location of a fluid-based electricity generator, the method comprising:

identifying a potentially suitable site anticipated to be suitable for operative location of a fluid-based electricity generator;

deploying at or within a predetermined distance from the potentially suitable site an apparatus 10 according to the first aspect of the invention;

obtaining surveyed data from the apparatus 10 over the predetermined time period; and determining, based on the surveyed data, whether the potentially suitable site is a suitable site for operative location for a fluid-based electricity generator.

Preferably, the apparatus 10 is inhibited in this aspect of the invention from moving with flow of the body of fluid 20.

According to a yet still further aspect, the present invention provides a method of determining an operative location for a fluid-based electricity generator, the method comprising:

identifying a potentially suitable site anticipated to be suitable for operative location of a fluid-based electricity generator;

deploying at or within a predetermined distance from the potentially suitable site an apparatus 10 according to the first aspect of the invention;

obtaining surveyed data from the apparatus 10 over the predetermined time period;

determining, based on the surveyed data, whether the potentially suitable site is a suitable site for operative location for a fluid-based electricity generator;

if the determination in step d. is that the potential suitable site is not suitable for operative deployment of a fluid-based electricity generator, identify a further potentially suitable site, and repeating the steps in respect of the further potentially suitable site and, if necessary for still further potentially suitable sites; and determining, based on the surveyed data from all potentially suitable sites, an operative site for a fluid-based electricity generator.

Preferably, the apparatus 10 is inhibited in this aspect of the invention from moving with flow of the body of fluid 20.

In the methods described herein, the term 'suitable' when used in relation to a site, includes a site at which if a fluid-based electricity generator was deployed a quantity of electricity that is likely to generated from the fluid-based electricity generator is sufficient to achieve at least one or more of the following:

justify deployment of the fluid-based electricity generator at that site;

offset the costs of deploying the electricity generator at that site;

enable a profit to be generated from deployment of the fluid-based electricity generator at that site;

select that site for deployment over another site for deployment of a fluid-based electricity generator; or surmise that that site is likely to be an optimal location for deployment of a fluid-based electricity generator.

More than one apparatus 10 may be deployed at, around and/or within each potentially suitable deployment site, according to any of the methods described herein.

The fluid-based electricity generator is a wind-turbine or a tidal turbine. In some particularly preferred embodiments, the fluid-based electricity generator is a tidal turbine adapted to be deployed, and operative, in a free stream.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

It is to be noted that, throughout the description and claims of this specification, the word "comprise" and variations of the word, such as "comprising" and "comprises", is not intended to exclude other variants or additional components, integers or steps. Modifications and improvements to the invention will be readily apparent to those skilled in the art. Such modifications and improvements are intended to be within the scope of this invention.

The invention claimed is:

1. Apparatus adapted to survey a predetermined characteristic within a body of fluid adjacent an axis that transects the body of fluid, the apparatus comprising:
   a survey member interposed between first and second position defining arrangements; and
   at least one instrumentality associated with the survey member, each instrumentality adapted to survey over a predetermined period of time, the predetermined characteristic of the body of fluid adjacent the axis,
   wherein at least one of the position defining arrangements is selected from the group consisting of one or more of:
   a. a buoyancy control device adapted to position that position defining arrangement at a predetermined depth within or on or adjacent a surface of the body of fluid or on or adjacent a floor of the body of fluid; and
   b. an engagement mechanism adapted to engage a fixed or floating structure completely or partially submerged in, or outside, the body of fluid.

2. The apparatus of claim 1, wherein the body of fluid is contained within fluid selected from the group consisting of one or more of: ocean, lake, river, creek, estuary, and fluid within a tunnel or cave.

3. The apparatus of claim 1, wherein the predetermined characteristic is selected from the group consisting of one or more of: velocity, the presence of a predetermined composition, and the concentration of a predetermined composition.

4. The apparatus of claim 1, wherein the survey member is formed from the group consisting of one or more of: chain, rope, cord, cable, wire and thread.

5. The apparatus of claim 1, wherein the survey member is treated with a coating to inhibit biofouling.

6. The apparatus of claim 1, further includes at least a second instrumentality adapted to survey at least one predetermined characteristic of the body of fluid adjacent the axis.

7. The apparatus of claim 1, further includes a Global Positioning System to produce geographical information of the apparatus.

8. The apparatus of claim 7, wherein the geographical information of the apparatus is predetermined.

9. The apparatus of claim 7, further includes a wireless transmitter capable of communicating data between itself and the instrumentality.

10. The apparatus of claim 9, wherein the data communicated is a combination selected from a group consisting: fluid velocities, presence of a predetermined composition, concentrations of a predetermined composition, time information, geographical information, and status/control/calibration/self-test data for the instrumentality or the wireless transmitter.

11. The apparatus of claim 1, wherein the predetermined period of time over which each instrumentality is adapted to survey the predetermined characteristic is selected from a group consisting: a day, a week, a month, three months, a year or longer.

12. Apparatus adapted to survey a predetermined characteristic within a body of fluid adjacent an axis that transects the body of fluid, where the results of the survey are used to identify a geographical location to be used for positioning a hydro-electricity generator in the body of fluid, the apparatus comprising:
 a survey member interposed between first and second position defining arrangements; and
 at least one instrumentality associated with the survey member, each instrumentality adapted to survey over a predetermined period of time the predetermined characteristic of the body of fluid adjacent the axis,
and
 wherein at least one of the position defining arrangements is selected from the group consisting of one or more of:
 a. a buoyancy control device adapted to position that position defining arrangement at a predetermined depth within or on or adjacent a surface of the body of fluid or on or adjacent a floor of the body of fluid; and
 b. an engagement mechanism adapted to engage a fixed or floating structure completely or partially submerged in, or outside, the body of fluid.

13. Apparatus adapted to identify a location in a body of fluid for deployment of a hydro-electricity generator by surveying a predetermined characteristic within the body of fluid adjacent an axis that transects the body of fluid, the apparatus comprising:
 a survey member interposed between first and second position defining arrangements; and
 at least one instrumentality associated with the survey member, each instrumentality adapted to survey over a predetermined period of time the predetermined characteristic of the body of fluid adjacent the axis,
and
 wherein at least one of the position defining arrangements is selected from the group consisting of one or more of:
 a. a buoyancy control device adapted to position that position defining arrangement at a predetermined depth within or on or adjacent a surface of the body of fluid or on or adjacent a floor of the body of fluid; and
 b. an engagement mechanism adapted to engage a fixed or floating structure completely or partially submerged in, or outside, the body of fluid.

14. Apparatus adapted to survey a predetermined characteristic within a body of fluid adjacent an axis that transects the body of fluid, the apparatus comprising:
 a survey member interposed between first and second position defining arrangements; and
 at least one instrumentality associated with the survey member, each instrumentality adapted to survey over a predetermined period of time the predetermined characteristic of the body of fluid adjacent the axis,
 wherein the apparatus is inhibited from moving with the flow of the body of fluid,
and
 wherein at least one of the position defining arrangements is selected from the group consisting of one or more of:
 a. a buoyancy control device adapted to position that position defining arrangement at a predetermined depth within or on or adjacent a surface of the body of fluid or on or adjacent a floor of the body of fluid; and
 b. an engagement mechanism adapted to engage a fixed or floating structure completely or partially submerged in, or outside, the body of fluid.

15. Apparatus adapted to survey a predetermined characteristic within a body of fluid adjacent an axis that transects the body of fluid, the apparatus comprising:
 a survey member interposed between first and second position defining arrangements; and
 at least one instrumentality associated with the survey member, each instrumentality adapted to survey over a predetermined period of time the predetermined characteristic of the body of fluid adjacent the axis,
 wherein the apparatus is affixed to a structure within or adjacent the body of fluid,
and
 wherein at least one of the position defining arrangements is selected from the group consisting of one or more of:
 a. a buoyancy control device adapted to position that position defining arrangement at a predetermined depth within or on or adjacent a surface of the body of fluid or on or adjacent a floor of the body of fluid; and
 b. an engagement mechanism adapted to engage a fixed or floating structure completely or partially submerged in, or outside, the body of fluid.

16. A method of surveying a predetermined characteristic within a body of fluid adjacent an axis that transects the body of fluid, the method comprising the steps of:
 a. deploying into a body of fluid an apparatus adapted to survey the predetermined characteristic, the apparatus comprising:
  a survey member interposed between first and second position defining arrangements; and
  at least one instrumentality associated with the survey member, each instrumentality adapted to survey over a predetermined period of time, the predetermined characteristic, and
  wherein at least one of the position defining arrangements is selected from the group consisting of one or more of:
  i. a buoyancy control device adapted to position that position defining arrangement at a predetermined depth within or on or adjacent a surface of the body of fluid or on or adjacent a floor of the body of fluid; and
  ii. an engagement mechanism adapted to engage a fixed or floating structure completely or partially submerged in, or outside, the body of fluid ; and b. obtaining survey data of one or more predetermined characteristics from one or more of the instrumentalities over a predetermined time period.

17. A method of determining whether a potential deployment site is suitable for operative location of a fluid-based electricity generator, the method comprising:
   a. identifying a potential deployment site anticipated to be suitable for operative location of a fluid-based electricity generator;
   b. deploying at or within a predetermined distance from the potential deployment site an apparatus according to claim 1;
   c. obtaining survey data from the apparatus over a predetermined time period; and
   d. determining, based on the survey data, whether the potential deployment site is suitable for operative location for a fluid-based electricity generator.

18. A method of determining an operative location for a fluid-based electricity generator, the method comprising:
   a. identifying a potential deployment site anticipated to be suitable for operative location of a fluid-based electricity generator;
   b. deploying at or within a predetermined distance from the potential deployment site an apparatus according to claim 1;
   c. obtaining survey data from the apparatus over a predetermined time period;
   d. determining, based on the survey data, whether the potential deployment site is suitable for operative location for a fluid-based electricity generator;
   e. if the determination is that the potential deployment site is not suitable for operative deployment of a fluid-based electricity generator, identifying a further potential deployment site, and repeating the steps in respect of the further potential deployment site and, if necessary for still further potential deployment sites; and
   f. determining, based on the survey data from all potential deployment sites, an operative site for a fluid-based electricity generator.

19. The method of claim 17, wherein 'suitable' when used in relation to an operative location for a fluid-based electricity generator, includes a site at which, if a fluid-based electricity generator was deployed, a quantity of electricity that can be generated from the fluid-based electricity generator is sufficient to achieve at least one or more of the following:
   a. justifying deployment of the fluid-based electricity generator at that site;
   b. offsetting of the costs of deploying the electricity generator at that site;
   c. enabling a profit to be generated from deployment of the fluid-based electricity generator at that site;
   d. selecting that site for deployment over another site for deployment of a fluid-based electricity generator; or
   e. surmising that that site is likely to be an optimal location for deployment of a fluid-based electricity generator.

20. The method of claim 18, wherein 'suitable' when used in relation to an operative location for a fluid-based electricity generator, includes a site at which, if a fluid-based electricity generator was deployed, a quantity of electricity that can be generated from the fluid-based electricity generator is sufficient to achieve at least one or more of the following:
   a. justification deployment of the fluid-based electricity generator at that site;
   b. offsetting of the costs of deploying the electricity generator at that site;
   c. enabling a profit to be generated from deployment of the fluid-based electricity generator at that site;
   d. selecting that site for deployment over another site for deployment of a fluid-based electricity generator; or
   e. surmising that that site is likely to be an optimal location for deployment of a fluid-based electricity generator.

* * * * *